(12) United States Patent
Son et al.

(10) Patent No.: US 9,783,096 B2
(45) Date of Patent: Oct. 10, 2017

(54) AUTOMOTIVE LAMP AND METHOD OF CONTROLLING THE SAME

(71) Applicant: SL Corporation, Daegu (KR)

(72) Inventors: Youngho Son, Gyeongsanbu-do (KR); Chang Woo Baek, Gyeongsanbu-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/375,696

(22) Filed: Dec. 12, 2016

(65) Prior Publication Data
US 2017/0182931 A1 Jun. 29, 2017

(30) Foreign Application Priority Data

Dec. 29, 2015 (KR) .................. 10-2015-0188210

(51) Int. Cl.
*B60Q 1/14* (2006.01)
*B60Q 1/16* (2006.01)
*F21S 8/10* (2006.01)

(52) U.S. Cl.
CPC .......... *B60Q 1/1423* (2013.01); *B60Q 1/143* (2013.01); *B60Q 1/16* (2013.01); *F21S 48/1747* (2013.01); *B60Q 2300/056* (2013.01); *B60Q 2300/112* (2013.01); *B60Q 2300/122* (2013.01); *B60Q 2300/314* (2013.01); *B60Q 2300/41* (2013.01); *B60Q 2300/42* (2013.01)

(58) Field of Classification Search
CPC ...... B60Q 1/0023; B60Q 1/1423; B60Q 1/16; B60Q 2300/056; B60Q 2300/42; B60Q 2300/41; F21S 48/17; F21S 48/20; F21S 48/21; F21S 48/1747; H05B 37/02
USPC ...... 315/82, 83, 77, 307, 312; 362/277, 509, 362/512, 514, 543–545
See application file for complete search history.

(56) References Cited

U.S. PATENT DOCUMENTS

| | | | | |
|---|---|---|---|---|
| 6,281,632 B1* | 8/2001 | Stam | ...................... | B60Q 1/085 250/208.1 |
| 8,562,192 B2* | 10/2013 | Tatara | ...................... | B60Q 1/12 362/509 |
| 8,729,803 B2* | 5/2014 | Yamazaki | .............. | B60Q 1/143 315/77 |
| 9,068,714 B2* | 6/2015 | Takahira | ................... | F21V 7/06 |
| 9,156,397 B2* | 10/2015 | Fujiyoshi | ............... | B60Q 1/143 |

(Continued)

*Primary Examiner* — Haissa Philogene
(74) *Attorney, Agent, or Firm* — Mintz Levin Cohn Ferris Glovsky and Popeo, P.C.; Kongsik Kim

(57) ABSTRACT

An automotive lamp which reduces dazzle to the drivers of other vehicles by adjusting a light pattern of irradiated light and a method of adjusting the automotive lamp is provided. An automotive lamp includes a light irradiation device which forms first and second patterns at least partially overlapping each other by irradiating light and a control device configured to adjust light irradiation device to form a shadow area at a position of a second vehicle when the second vehicle exists in an area of a beam pattern in which the first and second patterns are synthesized with each other. The control device is configured to determine a size of the shadow area by referring to whether the second vehicle exists in a non-uniform overlap section, in which the first pattern and the second pattern overlap each other to a non-uniform degree in an irradiation section of the light.

16 Claims, 33 Drawing Sheets

(56) References Cited

U.S. PATENT DOCUMENTS

2008/0084165 A1\* 4/2008 Otsuka ................ B60Q 1/0023
                                                            315/82
2016/0033102 A1\* 2/2016 Hiratsuka ........... F21S 48/1705
                                                           362/466

\* cited by examiner

FIG. 10

| LIGHT SOURCE | - ← LIGHT IRRADIATION ANGLE → + | | | |
|---|---|---|---|---|
| 126 | | | V | ▨ |
| 125 | | | | ▨ |
| 124 | | | ▨ | |
| 123 | | | ▨ | |
| 122 | | | | |
| 121 | | | | |
| 111 | | | ▨ | |
| 112 | | | | |
| 113 | | | | |
| 114 | | ▨ | | |
| 115 | | ▨ | | |
| 116 | ▨ | | | |

AUTOMOTIVE LAMP AND METHOD OF CONTROLLING THE SAME

CROSS-REFERENCE TO RELATED APPLICATIONS

This application claims the benefit of Korean Patent Application No. 10-2015-0188210, filed on Dec. 29, 2015, in the Korean Intellectual Property Office, the disclosure of which is incorporated herein by reference in its entirety.

BACKGROUND

1. Field of the Disclosure

The present disclosure relates to an automotive lamp and a method of controlling the same, and more particularly, to an automotive lamp which reduces dazzle to the drivers of other vehicles by adjusting a light pattern of irradiated light and a method of adjusting the automotive lamp.

2. Description of the Related Art

Generally, a vehicle includes automotive lamps having a lighting function and a signaling function. The lighting function enables the driver of the vehicle to detect objects around the vehicle while driving during low light conditions. The signaling function is used to inform other vehicles and road users of the vehicle's driving state. For example, a vehicle may be equipped with automotive lamps that directly emit light, such as a headlamp that illuminates the road ahead to secure the driver's view, a brake lamp that is turned on when the brakes are applied, and a turn signal lamp that is used to indication the driver's intention to turn the vehicle right or left.

Additionally, a reflector is disposed on the front and rear of the vehicle to reflect light such that the vehicle may be easily recognized. In particular, the headlamp secures the driver's view by irradiating light in the same direction as the driving direction of the vehicle when the vehicle is driven during low light conditions (e.g., at night or in, e.g., a tunnel with low ambient brightness). When a vehicle is driven with headlamps on at night, the headlamps may dazzle the drivers of preceding or oncoming vehicles located ahead in the driving direction of the vehicle and obstructs the drivers' view. In other words, the probability that a car accident will occur may increase.

To prevent this problem, adaptive driving beam (ADV) technology is applied to vehicles. A vehicle may include a plurality of light emitting units. When an ADB mode is applied, each of the light emitting units are configured to be turned on or off to prevent light from being irradiated to preceding or oncoming vehicles. However, when automotive lamps of a vehicle are controlled with a single aim of not dazzling the drivers of oncoming vehicles, sufficient visibility may not be secured for the driver of the vehicle. In other words, there is a need to provide sufficient visibility for the driver of a vehicle and prevent dazzling the drivers of other vehicles.

The above information disclosed in this section is merely for enhancement of understanding of the background of the invention and therefore it may contain information that does not form the prior art that is already known in this country to a person of ordinary skill in the art.

SUMMARY

The present disclosure provides an automotive lamp. According to an exemplary embodiment of the present disclosure, an automotive lamp may include a light irradiation device configured to form a first pattern and a second pattern at least partially overlapping each other by irradiating light and a control device configured to adjust the light irradiation device to form a shadow area at a position of a second vehicle when the second vehicle exists in an area of a beam pattern in which the first pattern and the second pattern are synthesized with each other. The control device is configured to determine a size of the shadow area by referring to whether the second vehicle exists in a non-uniform overlap section, in which the first pattern and the second pattern overlap each other to a non-uniform degree, in an irradiation section of the light. Hereinafter, a vehicle including a light irradiation device will be referred to as a first vehicle, and a vehicle such as a preceding vehicle or an oncoming vehicle will be referred to as a second vehicle.

According to another aspect of the disclosure, there is provided a method of controlling an automotive lamp. The method may include forming, a controller, a first pattern and a second pattern, which at least partially overlap each other, by irradiating light, determining, by the controller, whether a second vehicle exists in an area of a beam pattern in which the first pattern and the second pattern are synthesized with each other and forming, by the controller, a shadow area at a position of the second vehicle by adjusting a light irradiation device based on the determination result. The forming of the shadow area may include setting a size of the shadow area by referring to whether the second vehicle exists in a non-uniform overlap section, in which the first pattern and the second pattern overlap each other to a non-uniform degree, in an irradiation section of the light.

BRIEF DESCRIPTION OF THE DRAWINGS

These and/or other aspects will become apparent and more readily appreciated from the following description of the embodiments, taken in conjunction with the accompanying drawings in which:

FIG. 10 illustrates an exemplary light irradiation angles of light sources used to form a shadow area according to an exemplary embodiment of the present disclosure;

DETAILED DESCRIPTION

Figure 1:
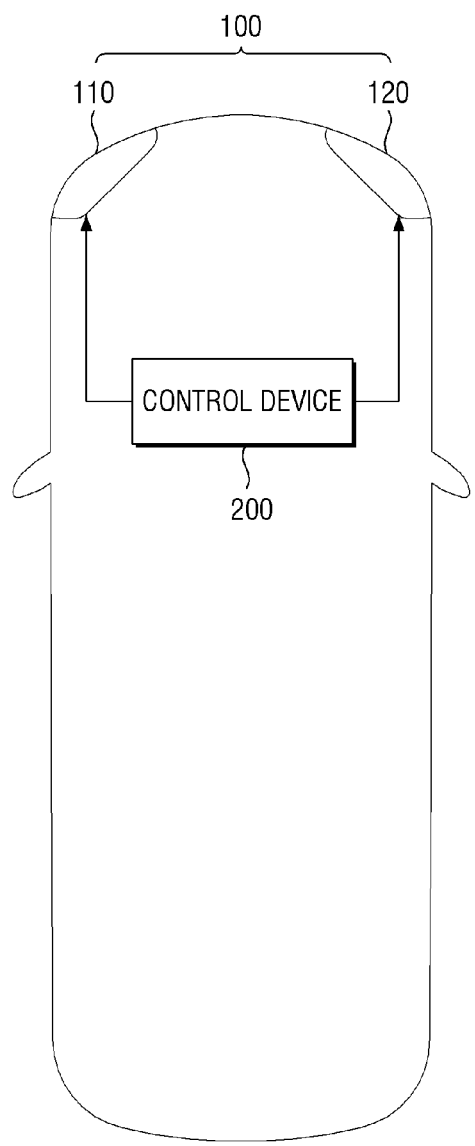
FIG. 1 illustrates an exemplary automotive lamp according to an exemplary embodiment of the present disclosure.

The present disclosure will now be described more fully with reference to the accompanying drawings, in which exemplary embodiments of the disclosure are shown. Advantages and features of the disclosure and methods of accomplishing the same may be understood more readily by reference to the following detailed description of exemplary embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims. Like reference numerals refer to like elements throughout the specification.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, may be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 illustrates an automotive lamp 10 according to an exemplary embodiment. Referring to FIG. 1, the automotive lamp 10 according to the exemplary embodiment may include a light irradiation device 100 and a control device 200. In the exemplary embodiment, a case where the automotive lamp 10 may be disposed on both sides of the front of a vehicle (hereinafter, referred to as a first vehicle) and used as a headlamp for securing forward visibility when the first vehicle may be driven during low light conditions (e.g., at night or in a dark place such as a tunnel) will be described. However, this is merely an example used to help understand the disclosure. Therefore, the vehicle lamp 10 of the disclosure may be used not only as a headlamp but also as various lamps for various purposes such as a fog lamp, a tail lamp, a brake lamp, a turn signal lamp, a position lamp and a daytime running lamp.

In addition, in the exemplary embodiment, a case where the automotive lamp 10, as a headlamp, forms a high beam pattern to secure far visibility ahead of the first vehicle will be described. When there is another vehicle (hereinafter, referred to as a second vehicle) such as an oncoming vehicle or a preceding vehicle, the automotive lamp 10 may form a shadow area by preventing light from being irradiated to an area that corresponds to the position of the second vehicle or reducing the amount of light irradiated to the area. Therefore, the driver of the second vehicle may be prevented from being subject to glare (e.g., dazzled). While the case where the automotive lamp 10 forms a high beam pattern is described in the exemplary embodiment, the automotive lamp 10 may also form a low beam pattern to secure near visibility.

The light irradiation device 100 may be configured to form a beam pattern by irradiating light. In other words, the light irradiation device 100 may include a first light irradiator 110 disposed on a front left side of the first vehicle having the light irradiation device 100 and a second light irradiator 120 disposed on a front right side of the first vehicle. In particular, the first light irradiator 100 may be understood as a left headlamp, and the second light irradiator 120 may be understood as a right headlamp.

In the exemplary embodiment, a case where a plurality of light irradiators are provided is described. However, this is merely intended to use the automotive lamp 10 as a headlamp, and the number of light irradiators is not limited to a particular number. In particular, the number, installation position, installation direction, etc. of light irradiators may vary according to the purpose of the automotive lamp 10.

Figure 2:
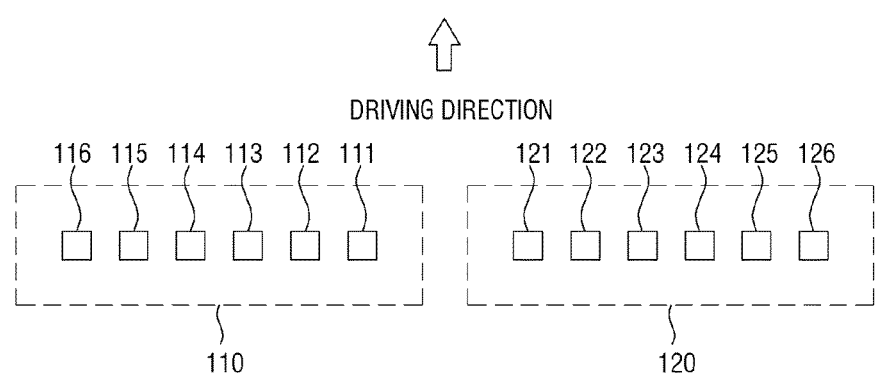
FIG. 2 illustrates an exemplary first light irradiator and a second light irradiator according to an exemplary embodiment of the present disclosure.

Each of the first light irradiator 110 and the second light irradiator 120 may include at least one light source. A case where each of the first light irradiator 110 and the second light irradiator 120 includes a plurality of light sources (111 through 116 or 121 through 126) as illustrated in FIG. 2 will mainly be described below. A plurality of light sources included in the first light irradiator 110 will be referred to as first through sixth light sources 111 through 116 in a direction from the inside of the first vehicle toward the exterior of the first vehicle. Similarly, a plurality of light sources included in the second light irradiator 120 will be referred to as first through sixth light sources 121 through 126 in the direction from the interior of the first vehicle toward the exterior of the first vehicle. The first through sixth light sources 111 through 116 or 121 through 126 included in each of the first light irradiator 110 and the second light irradiator 120 may respectively form a plurality of partial beam patterns by irradiating light. In particular, light irradiated by one light source may form one partial beam pattern.

Figure 3:
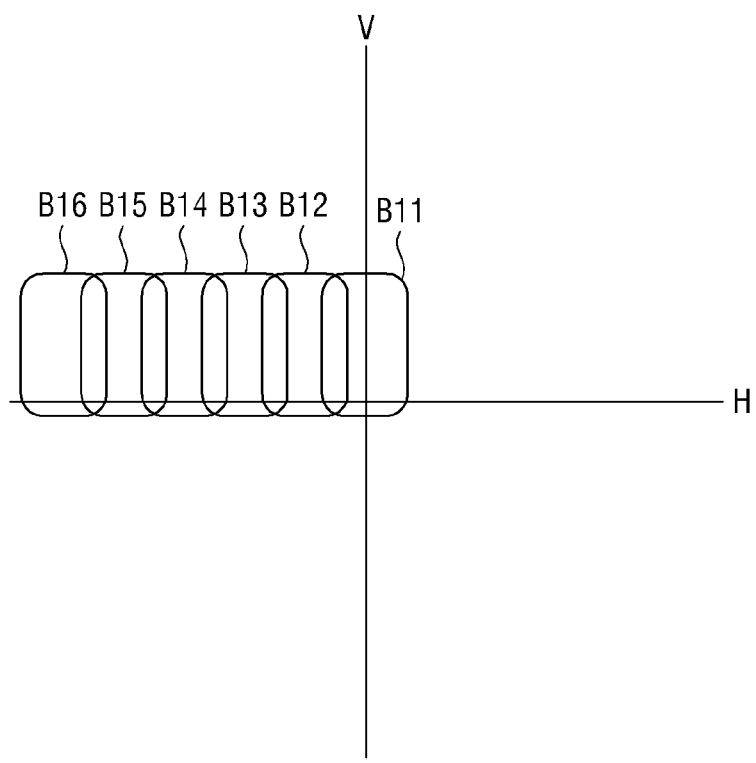
FIG. 3 illustrates an exemplary plurality of partial beam patterns formed by the first light irradiator according to an exemplary embodiment of the present disclosure.
Figure 4:
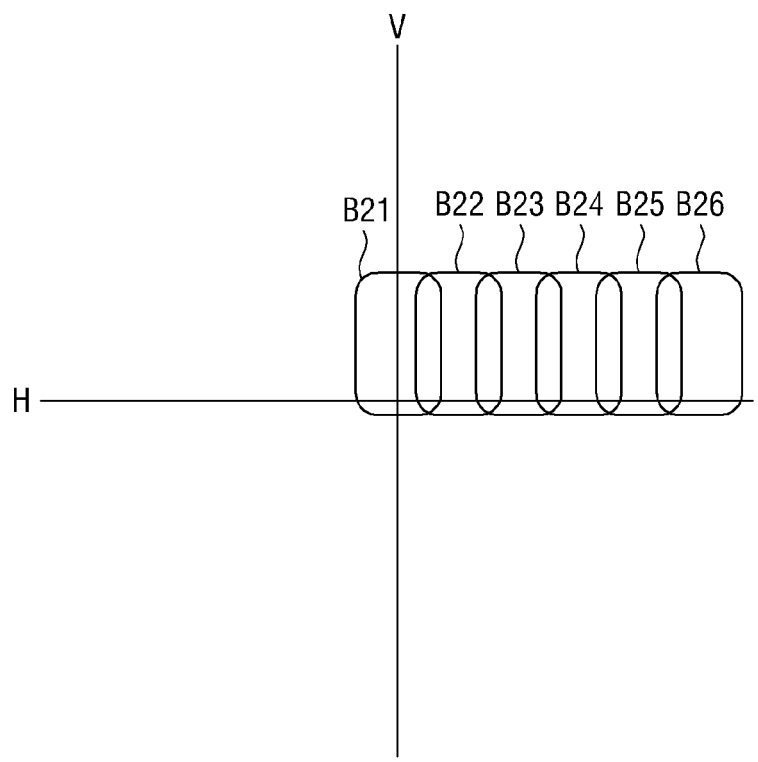
FIG. 4 illustrates an exemplary plurality of partial beam patterns formed by the second light irradiator according to an exemplary embodiment of the present disclosure.

FIG. 3 illustrates a plurality of partial beam patterns B11 through B16 formed by light irradiated from the first through sixth light sources 111 through 116 included in the first light irradiator 110. FIG. 4 illustrates a plurality of partial beam patterns B21 through B26 formed by light irradiated from the first through sixth light sources 121 through 126 included in the second light irradiator 120. As illustrated in the drawings, adjacent partial beam patterns may overlap each other. Accordingly, the formation of an unintended shadow area may be prevented.

Figure 5:
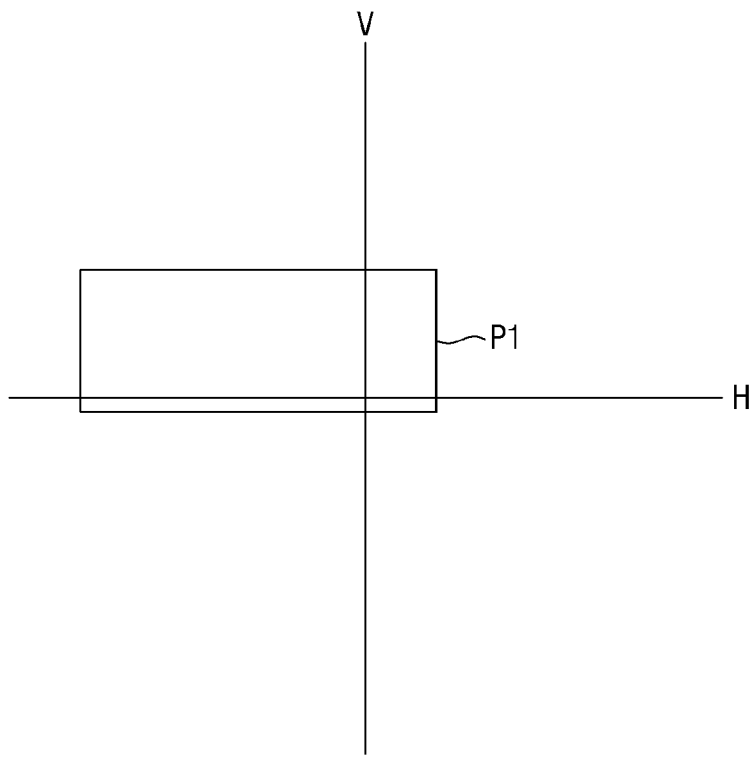
FIG. 5 illustrates an exemplary first pattern formed by the first light irradiator according to an exemplary embodiment of the present disclosure.
Figure 6:
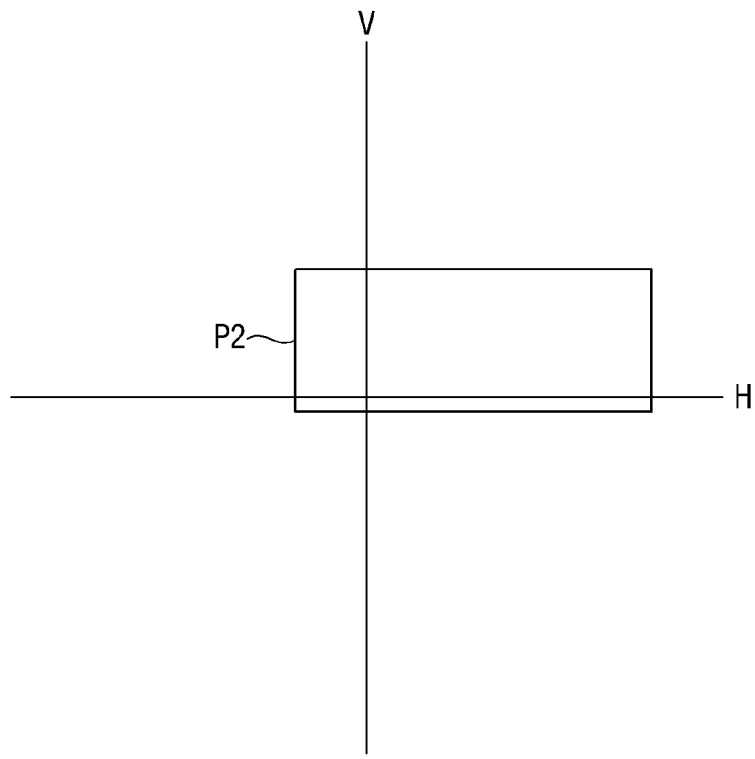
FIG. 6 illustrates an exemplary second pattern formed by the second light irradiator according to an exemplary embodiment of the present disclosure.
Figure 7:
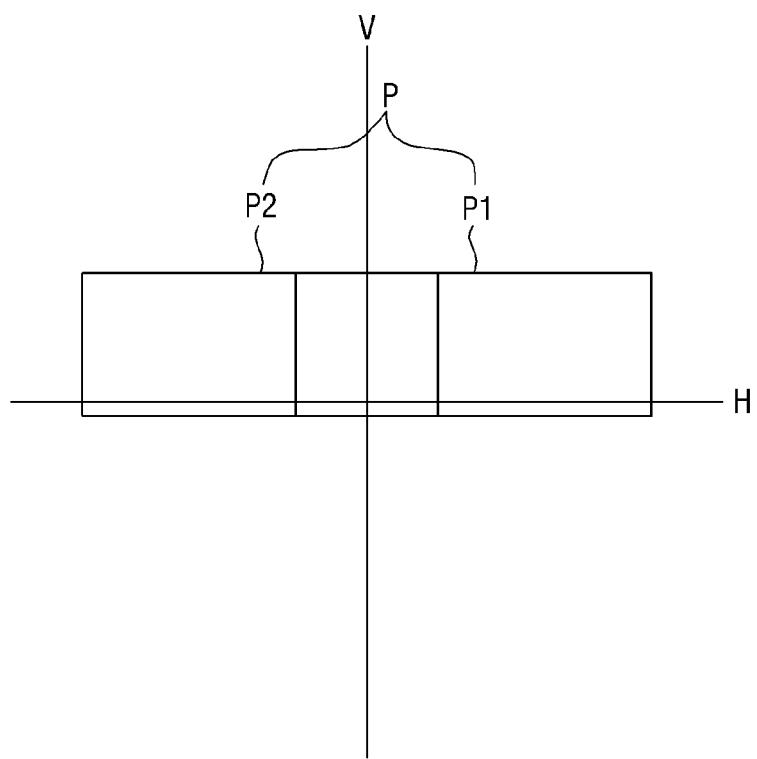
FIG. 7 illustrates an exemplary beam pattern formed by the first light irradiator and the second light irradiator according to an exemplary embodiment of the present disclosure.
Figure 8:
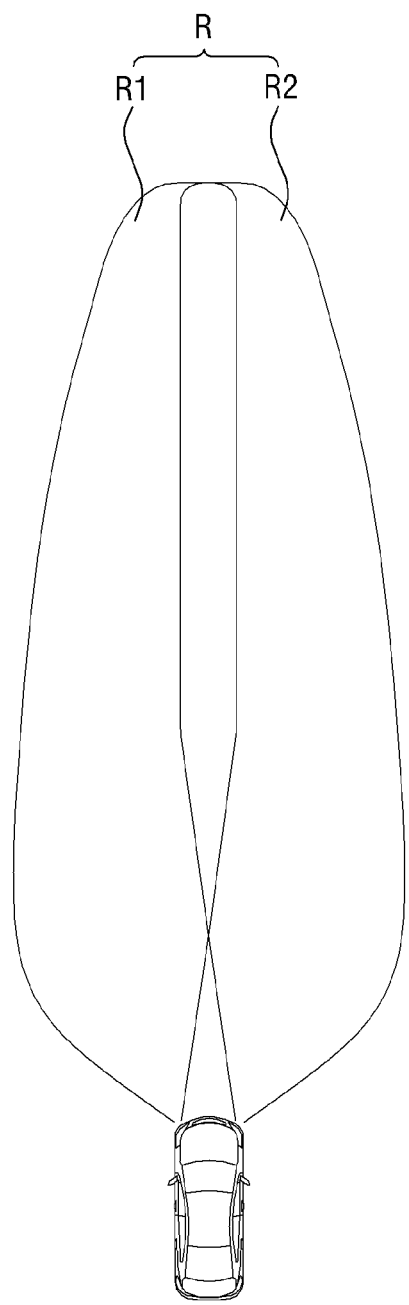
FIG. 8 illustrates an exemplary road pattern formed by the first light irradiator and the second light irradiator according to an exemplary embodiment of the present disclosure.

The partial beam patterns B11 through B16 formed by the first light irradiator 110 may be synthesized together to form a first pattern P1 as illustrated in FIG. 5. The partial beam patterns B21 through B26 formed by the second light irradiator 120 may be synthesized together to form a second pattern P2 as illustrated in FIG. 6. In addition, the first pattern P1 formed by the first light irradiator 110 and the second pattern P2 formed by the second light irradiator 120 may be synthesized together to form a beam pattern P or a road pattern R as illustrated in FIG. 7 or 8.

In FIGS. 3 through 7, the beam pattern P formed on a screen located at a specific distance from the front of the first vehicle is illustrated. In FIG. 8, the road pattern R formed ahead of the first vehicle is illustrated. The road pattern R may be formed by the synthesis of a first road pattern R1 that corresponds to the first pattern P1 and a second road pattern R2 that corresponds to the second pattern P2. The first pattern P1 and the second pattern P2 formed by the first light irradiator 110 and the second light irradiator 120 may at least partially overlap each other. In particular, the first pattern P1 and the second pattern P2 may at least partially overlap each other in a central portion of the beam pattern P.

The first through sixth light sources 111 through 116 included in the first light irradiator 110 may respectively form different partial areas within the area of the first pattern P1, and the partial areas may partially overlap each other. Similarly, the first through sixth light sources 121 through 126 included in the second light irradiator 120 may respectively form different partial areas within the area of the second pattern P2, and the partial areas may partially overlap each other. Light irradiation angles of the first through sixth light sources 111 through 116 or 121 through 126 included in each of the first light irradiator 110 and the second light irradiator 120 are illustrated in FIG. 9.

Figure 9:
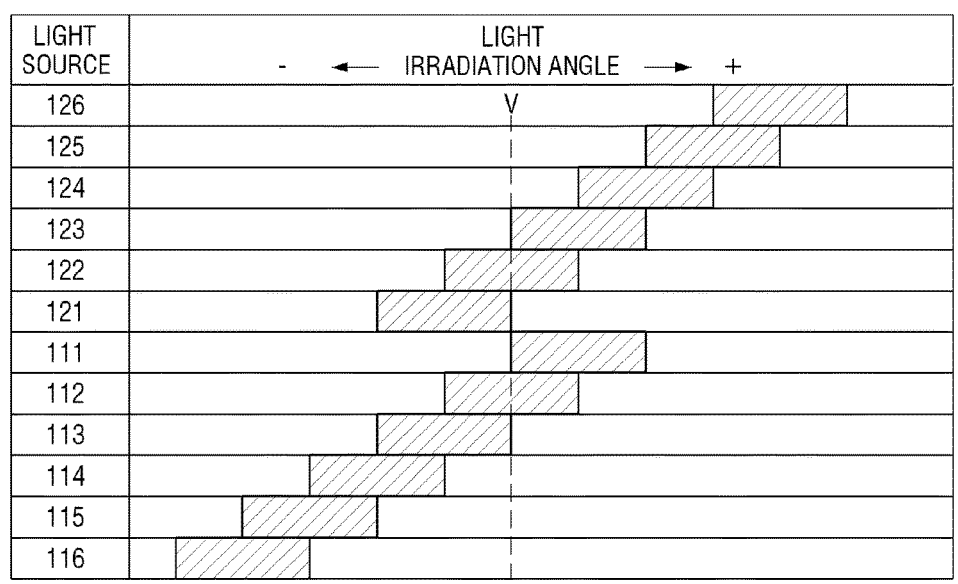
FIG. 9 illustrates an exemplary light irradiation angles of a plurality of light sources included in the first light irradiator and the second light irradiator according to an exemplary embodiment of the present disclosure.

Referring to FIG. 9, the respective light irradiation angles of the first through sixth light sources 111 through 116 included in the first light irradiator 110 may partially overlap each other. Further, the respective light irradiation angles of the first through sixth light sources 121 through 126 included in the second light irradiator 120 may partially overlap each other. In particular, the first pattern P1 formed by the first light irradiator 110 and the second pattern P2 formed by the second light irradiator 120 partially overlap each other in the central portion of the beam pattern P based on a centerline V of the first vehicle.

As described above, the first pattern P1 formed by the first light irradiator 110 and the second pattern P2 formed by the second light irradiator 120 may overlap each other in the central portion of the beam pattern P, and the partial areas formed by the first through sixth light sources 111 through 116 included in each of the first light irradiator 110 and the second light irradiator 120 may overlap each other. Therefore, it is possible to prevent a shadow area to which light is not irradiated from being formed due to an installation gap between light sources and to secure sufficient forward visibility for the drivers.

In FIG. 9, "+" indicates that light may be irradiated to the right of the centerline V of the first vehicle, and "−" indicates that light may be irradiated to the left of the centerline V of the first vehicle. In addition, in FIG. 9, "V" may indicate not only the centerline of the first vehicle but also a central axis of light irradiated by the light irradiation device 100. The amount of light of at least one of the first through sixth light sources 111 through 116 and 121 through 126 included in the first and second light irradiators 110 and 120 may be adjusted based on the position of the second vehicle, thereby forming a shadow area.

In the exemplary embodiment, adjusting the amount of light may be achieved by turning one or more light sources off but also by reducing the intensity of an electric current applied to the light sources. When the second vehicle exists within the area of the beam pattern P, the control device 200 may be configured to adjust the light irradiation device 100 to form a shadow area at the position of the second vehicle. For example, the control device 200 may be configured to form a shadow area by adjusting the amount of light of some of the first through sixth light sources 111 through 116 and 121 through 126 included in the first and second light irradiators 110 and 120.

Figure 11:
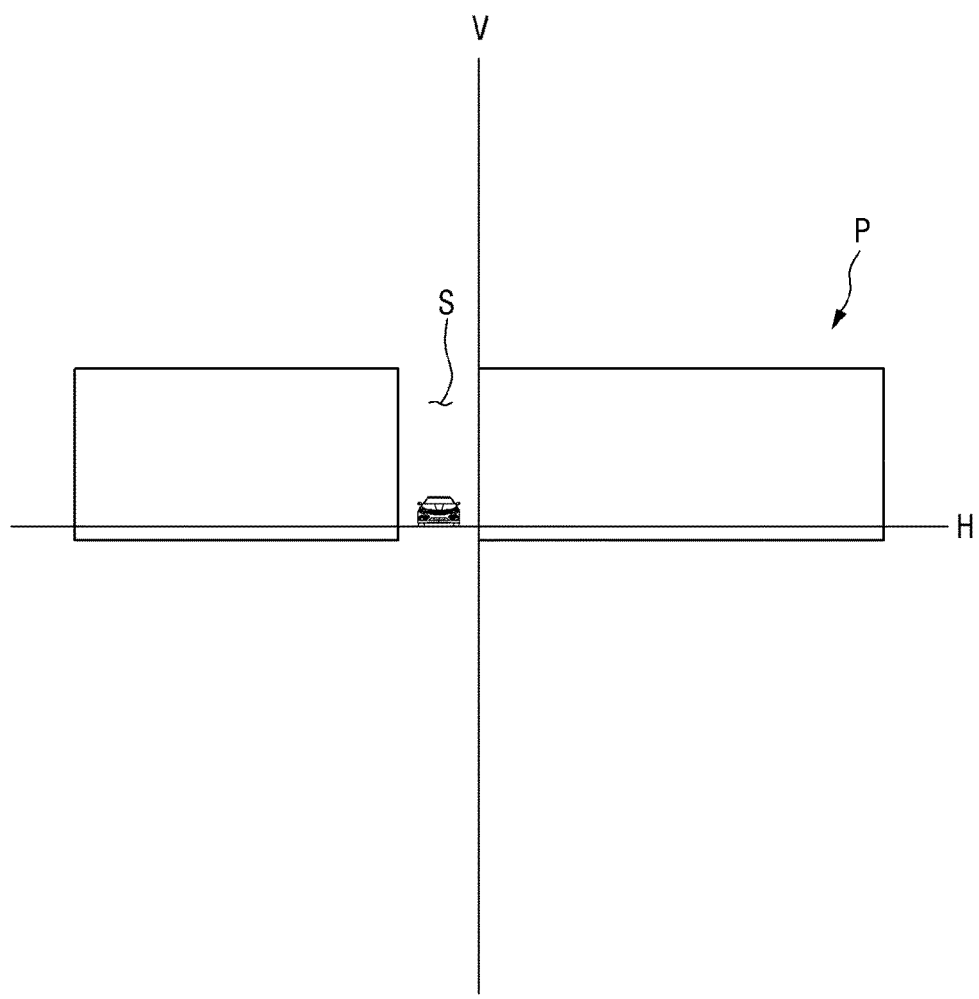
FIG. 11 illustrates an exemplary shadow area formed in a beam pattern according to an exemplary embodiment of the present disclosure.
Figure 12:
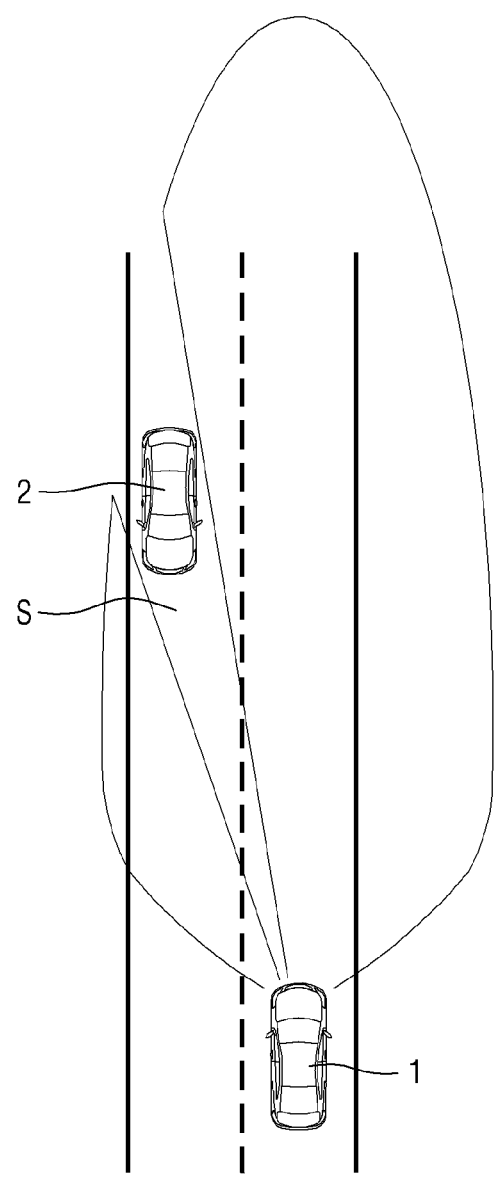
FIG. 12 illustrates an exemplary shadow area formed in a road pattern.

Specifically, in a state where light is irradiated in a normal direction from the first through sixth light sources 111 through 116 and 121 through 126 included in the first light irradiator 110 and the second light irradiator 120 as illustrated in FIG. 9, the control device 200 may form a shadow area by adjusting the amount of light of the second light source 112 and the third light source 113 of the first light irradiator 110 and the amount of light of the first light source 121 and the second light source 122 of the second light irradiator 120 as illustrated in FIG. 10. For example, the shadow area may be formed at the position of the second vehicle. FIG. 11 illustrates a shadow area S included in the beam pattern P. FIG. 12 illustrates the shadow area S included in the road pattern R.

The position of a second vehicle 2 with respect to a first vehicle 1 may be changed. Therefore, the control device 200 may be configured to continuously detect the position of the second vehicle 2 and adjust the amount of light of the first through sixth light sources 111 through 116 and 121 through 126 included in the light irradiation device 100 to form the shadow area S at the position of the second vehicle 2. When forming the shadow area S, the control device 200 according to the exemplary embodiment may be configured to determine the size of the shadow area S by referring to the position of the second vehicle 2 in the beam pattern P. In particular, the control device 200 may be configured to alter the shadow area S to different sizes when the second vehicle 2 exists in a central area of the beam pattern P and when the second vehicle 2 exists in an area other than the central area of the beam pattern P.

In addition, the control device 200 may be configured to determine the size of the shadow area S in view of at least one of information about the first vehicle 1 including the light irradiation device 100, information about the second vehicle 2, and information about the surrounding environment. The control device 200 may also set the size of the shadow area S by referring to whether the second vehicle 2 exists in a non-uniform overlap section, in which the first pattern P1 and the second pattern P2 overlap each other to a non-uniform degree, in a light irradiation section. In particular, the control device 200 may be configured to adjust the shadow area S to different sizes when the second vehicle 2 exists in a uniform overlap section and when the second vehicle 2 exists in the non-uniform overlap section.

Furthermore, the control device 200 may be configured to determine whether to form the shadow area S by referring to the position of the second vehicle 2 in the beam pattern P. In particular, the control device 200 may be configured to determine whether to form the shadow area S based on whether the second vehicle 2 exists in the central area of the beam pattern P or in an area other than the central area of the beam pattern P. The control device 200 will now be described in detail with reference to FIG. 13.

Figure 13:
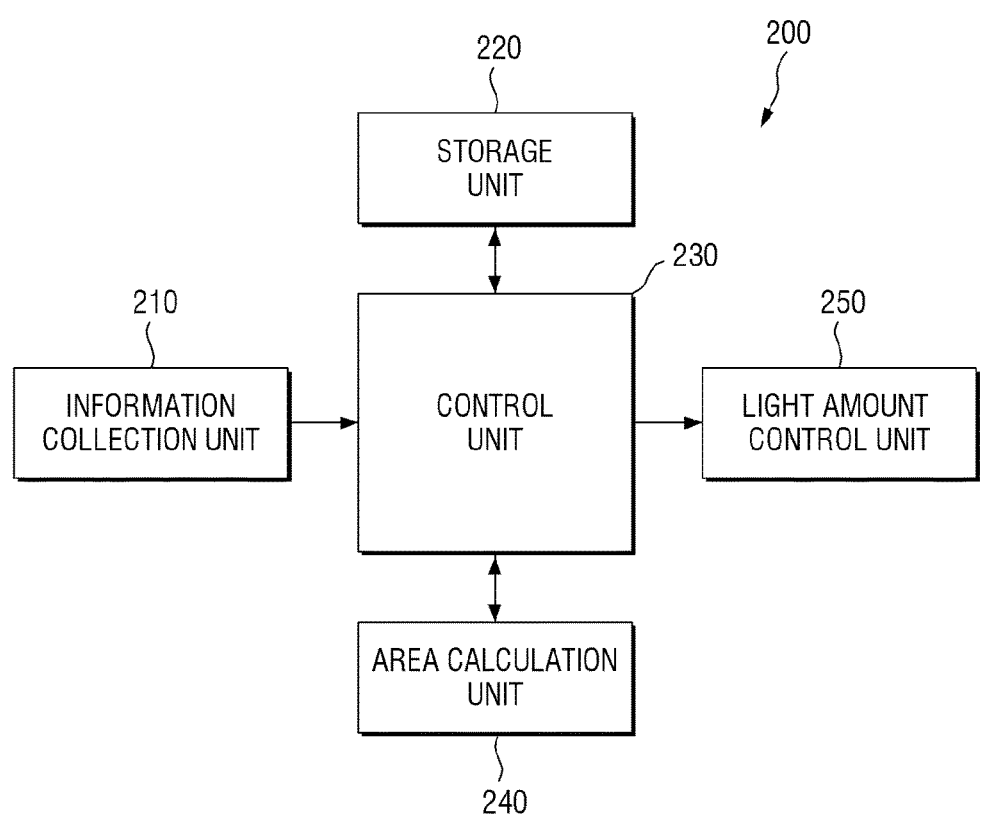
FIG. 13 is an exemplary block diagram of a control device according to an exemplary embodiment of the present disclosure.

FIG. 13 is an exemplary block diagram of a control device 200 according to an exemplary embodiment. Referring to FIG. 13, the control device 200 may include an information collection unit 210, a storage unit 220, a control unit 230, an area calculation unit 240, and a light amount adjustment unit 250. The information collection unit 210 collects information about the first vehicle 1, information about the second vehicle 2, and information about the surrounding environment.

The information about the first vehicle 1 may include at least one of a driving speed and a handle steering angle. The information about the second vehicle 2 may include at least one of a relative speed of the second vehicle 2, a horizontal position change rate of the second vehicle 2, and a distance from the second vehicle 2. The information about the surrounding environment may include ambient brightness. For example, the relative speed of the second vehicle 2 indicates the speed of the second vehicle 2 relative to the speed of the first vehicle 1. In particular, the relative speed of the second vehicle 2 may be understood as the speed of the second vehicle 2 sensed at the position of the first vehicle 1. In particular, in the disclosure, the relative speed of the second vehicle 2 may indicate the speed at which the second vehicle 2 is approaching or driving away from the first vehicle 1.

The horizontal position change rate of the second vehicle 2 may indicate the speed at which the second vehicle 2 moves horizontally with respect to the first vehicle 1. In particular, in the disclosure, the horizontal position change rate of the second vehicle 2 may indicate the speed at which the second vehicle 2 moves from left to right or from right to left in front of the first vehicle 1.

To collect the information, the information collection unit 210 may include various sensing media (not illustrated). For example, the information collection unit 210 may include a speed sensing medium (not illustrated) configured to sense the driving speed of the first vehicle 1, a steering angle sensing medium (not illustrated) for configured to sense the handle steering angle of the first vehicle 1, a speed sensing medium (not illustrated) configured to sense the relative speed of the second vehicle 2, and an image capturing medium (not illustrated) and an image analyzing medium (not illustrated) that may include a camera configured to sense the horizontal position change rate of the second vehicle 2. In addition, the information collection unit 210 may include a distance sensing medium (not illustrated) configured to sense the distance from the second vehicle 2 and a luminance sensing medium (not illustrated) configured to sense ambient brightness.

The above sensing media are merely examples, and the information collection unit 210 may include various types of sensing media to sense the above information. The information collection unit 210 may also receive information from a sensing device (not illustrated) separate from the control device 200. In other words, the information collection unit 210 may include a communication medium (not illustrated) which may communicate with the sensing device. The storage unit 220 may temporarily or permanently store information collected by the information collection unit 210. In addition, the storage unit 220 temporarily stores various information or data received from within the control device 200.

Figure 14:
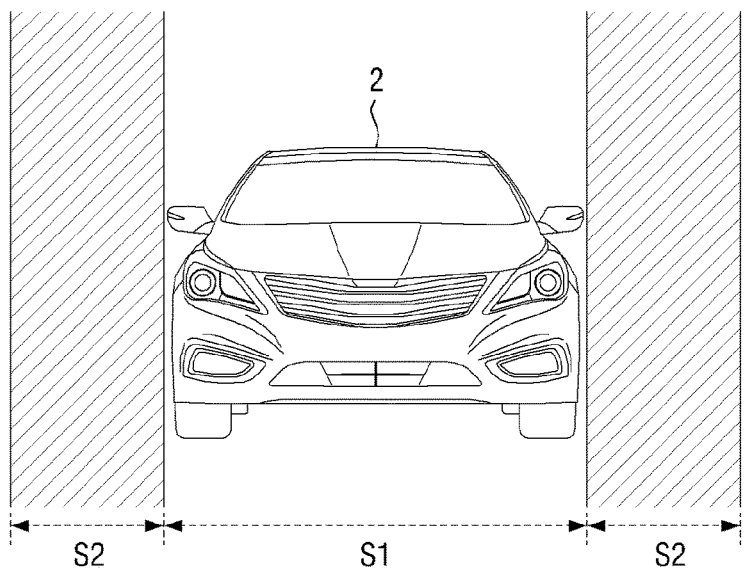
FIG. 14 illustrates an exemplary shadow area according to an embodiment.

The area calculation unit 240 may be configured to calculate the size of a shadow area. A shadow area S according to an exemplary embodiment may include a first shadow area S1 and a second shadow area S2 as illustrated in FIG. 14. The first shadow area S1 may be an area that corresponds to the size of a second vehicle, and the second shadow area S2 may be an area extending for a preset distance from the boundary of the first shadow area S1.

As described above, the information collection unit 210 may include the image capturing medium and the image analyzing medium. An image captured by the image capturing medium may be analyzed by the image analyzing medium to calculate the position and size of the second vehicle 2. The area calculation unit 240 may be configured to calculate the position and size of the first shadow area S1 by applying the calculated position and size of the second vehicle 2. When the first shadow area S1 alone may be applied to the second vehicle 2, the driver of the second vehicle 2 may be dazzled by some light. This is because even when the position and size of the second vehicle 2 are calculated using information collected by the information collection unit 210, there may be an error between the calculated position and size and the actual position and size of the second vehicle 2.

In addition, the shadow area S may be formed by adjusting the amount of light of one or more light sources in response to the movement of the second vehicle 2. However, there may be cases where the amount of light of the light sources cannot be adjusted smoothly in response to the movement of the second vehicle 2 due to the limited calculation speed of the area calculation unit 240 and the limited response speed of the light amount adjustment unit 250. Therefore, the shadow area S may be formed by extending the first shadow area S1 by a specific size. In other words, the extended portion of the first shadow area S1 may be the second shadow area S2.

Figure 15:
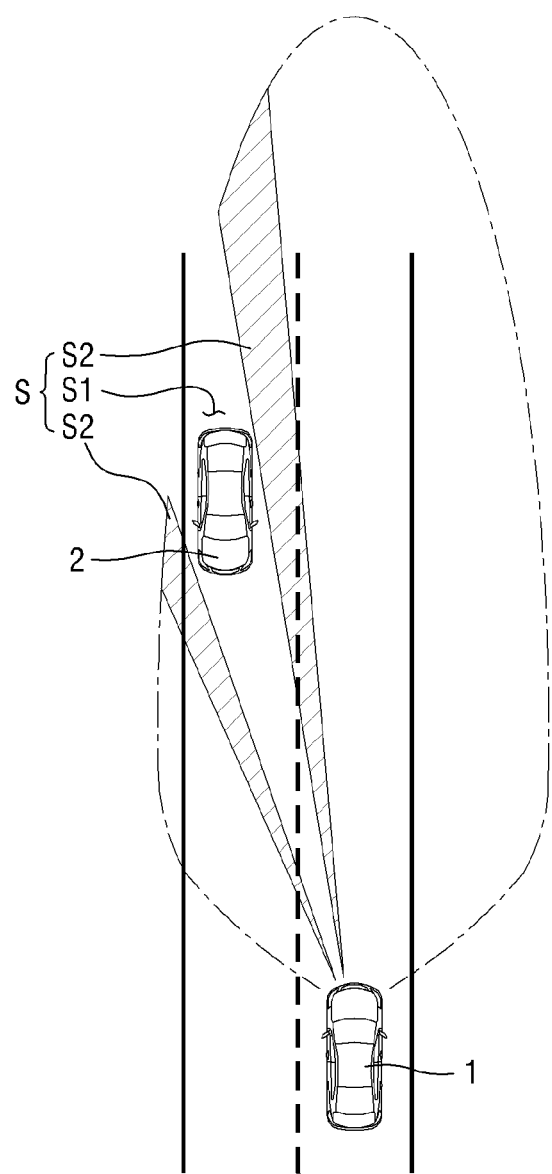
FIG. 15 illustrates an exemplary shadow area including a second shadow area formed in a road pattern according to an exemplary embodiment of the present disclosure.

FIG. 15 illustrates the shadow area S including the second shadow area S2 formed in the road pattern R according to an exemplary embodiment. Since the shadow area S includes the second shadow area S2, the driver of the second vehicle 2 may be more efficiently prevented from being dazzled. The second shadow area S2 may be understood as an extra area of a specific size reflected in the first shadow area S1.

Referring back to FIG. 13, the area calculation unit 240 may be configured to calculate the size of the second shadow area S2 by referring to information collected by the information collection unit 210. For example, the area calculation unit 240 may be configured to calculate the size of the second shadow area S2 by referring to the position of the second vehicle 2 in the beam pattern P. Then, the calculated size of the second shadow area S2 and the size of the first shadow area S1 may be added together to calculate the size of the shadow area S to be applied to the second vehicle 2. Calculating the size of the shadow area S according to the position of the second vehicle 2 will be described in detail later with reference to FIGS. 16 through 19.

In addition, the area calculation unit 240 may calculate the size of the second shadow area S2 in view of at least one of the information about the first vehicle 1, the information about the second vehicle 2, and the information about the surrounding environment. Then, the calculated size of the second shadow area S2 and the size of the first shadow area S1 may be added together to calculate the size of the shadow area S to be applied to the second vehicle 2. Calculating the size of the shadow area S in view of the collected information will be described in detail later with reference to FIG. 20.

The area calculation unit 240 may also be configured to calculate the size of the second shadow area S2 by referring to whether the second vehicle 2 exists in the non-uniform overlap section, in which the first pattern P1 and the second pattern P2 overlap each other to a non-uniform degree, in the light irradiation section. Then, the calculated size of the second shadow area S2 and the size of the first shadow area S1 may be added together to calculate the size of the shadow area S to be applied to the second vehicle 2. Calculating the size of the shadow area S in view of whether the second vehicle 2 exists in the non-uniform overlap section will be described in detail later with reference to FIGS. 21 through 28.

Furthermore, the area calculation unit 240 may be configured to determine whether to form the shadow area S by referring to the position of the second vehicle 2 in the beam pattern P. Calculating the size of the shadow area S according to the position of the second vehicle 2 will be described in detail later with reference to FIGS. 29 through 32.

The light amount adjustment unit 250 may be configured to adjust the amount of light of each of the first through sixth light sources 111 through 116 and 121 through 126 included in the light irradiation device 100. The light amount adjustment unit 250 may enable the shadow area S of a specific size to be formed at a specific position in the beam pattern P by adjusting the amount of light of the first through sixth light sources 111 through 116 and 121 through 126. For example, the light amount adjustment unit 250 may enable the shadow area S to be formed by turning one or more light sources off or reducing the amount of light of the light sources. In addition, the light amount adjustment unit 250 may enable the position of the shadow area S to be altered based on the position of the second vehicle 2 by adjusting the amount of light of one or more light sources. The control unit 230 may be configured to adjust the information collection unit 210, the storage unit 220, the area calculation unit 240, and the light amount adjustment unit 250.

Figure 16:
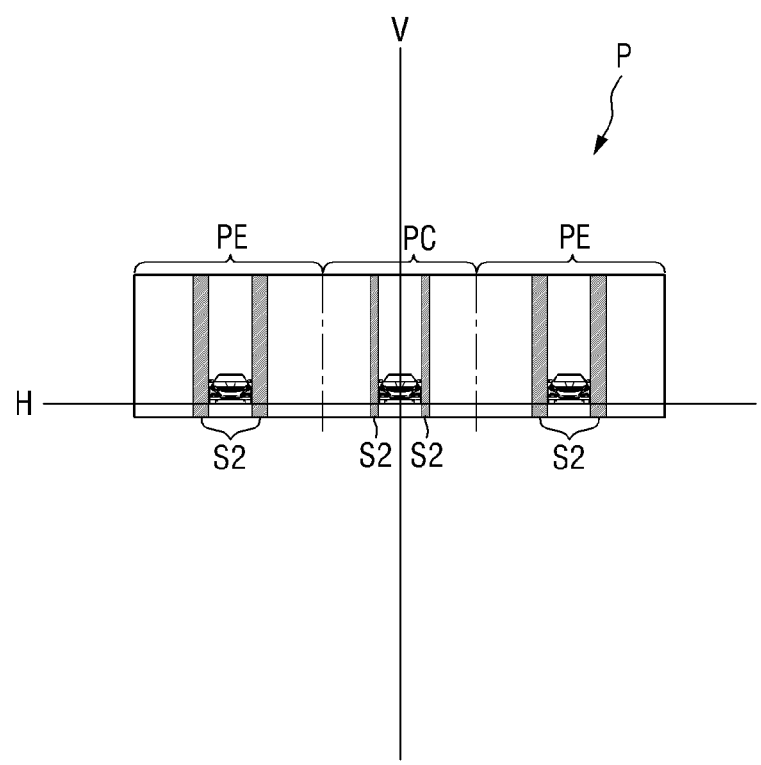
FIGS. 16 and 17 illustrate the exemplary size of the second shadow area in each area of a beam pattern according to an exemplary embodiment of the present disclosure.
Figure 17:
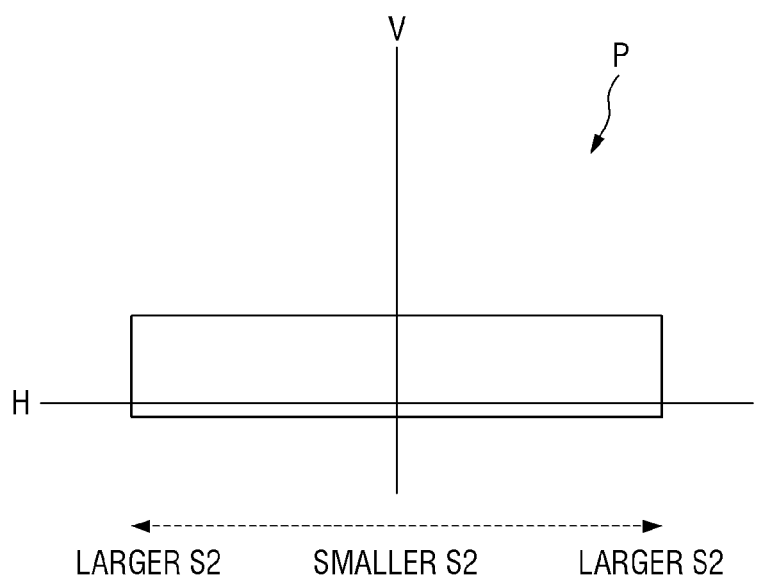

FIGS. 16 and 17 illustrate the size of the second shadow area S2 in each area of the beam pattern P according to an exemplary embodiment. As described above, the control device 200 may be configured to determine the size of the shadow area S by referring to the position of the second vehicle 2 in the beam pattern P. In particular, as illustrated in FIG. 16, the control device 200 may be configured to increase the second shadow area S2 to a greater size when the second vehicle 2 exists in an area (i.e., a peripheral area PE) external to a preset central area PC of the beam pattern P than when the second vehicle 2 exists in the central area PC of the beam pattern P.

The position and size of the second vehicle 2 may be perceived by the image capturing medium and the image analyzing medium. In the disclosure, the image capturing medium may be configured to capture an image of an area ahead of the first vehicle 1. Therefore, the movement of the second vehicle 2 may be more active when the second vehicle 2 may be located proximate to a left or right edge of an image area of the image captured by the image capturing medium than when the second vehicle 2 may be located around a center of the image area.

In other words, when the second vehicle 2 exists around the center of the image area, a change rate (hereinafter, referred to as an image area change rate) of the second vehicle 2 in the image area according to a change in the distance from the first vehicle 1 may be low. Conversely, when the second vehicle 2 exists proximate to the left or right edge of the image area, the image area change rate of the second vehicle 2 according to a change in the distance from the first vehicle 1 may be high. In particular, the image area change rate of the second vehicle 2 which passes the left or right side of the first vehicle 1 may be perceived high.

The image area of the image captured by the image capturing medium may be similarly mapped to the area of the beam pattern P. Therefore, when the second vehicle 2 exists in the preset central area PC of the beam pattern P, the control device 200 may be configured to form the second shadow area S2 to a relatively small size. Conversely, when the second vehicle 2 exists in the peripheral area PE of the beam pattern P, the control device 200 may be configured to increase the second shadow area S2 to a relatively greater size. Since the second shadow area S2 may be set to a different size according to the position of the second vehicle 2 in the beam pattern P, it may be possible to secure sufficient visibility for the driver of the first vehicle 1 and prevent the driver of the second vehicle 2 from being dazzled.

In addition, the area calculation unit 240 of the control device 200 according to the exemplary embodiment may be configured to calculate the size of the second shadow area S2 by referring to information collected by the information collection unit 210. The area calculation unit 240 may first determine the position of the second vehicle 2 in the beam pattern P. When the second vehicle 2 may be included in the central area PC of the beam pattern P, the area calculation unit 240 may be configured to calculate a relatively small size for the second shadow area S2.

However, when the second vehicle 2 is included in the peripheral area PE, not the central area PC of the beam pattern P, the area calculation unit 240 may be configured to calculate a relatively greater size for the second shadow area S2. Here, the central area PC may be a preset area whose range may be determined at the time of manufacture or changed in real time by the driver. Likewise, the size of the second shadow area S2 may be determined at the time of manufacture or changed in real time by the driver. However, the size of the second shadow area S2 may be determined to be greater when the second vehicle 2 exists in the peripheral area PE of the beam pattern P than when the second vehicle 2 exists in the central area PC of the beam pattern P.

The range of the central area PC, the large size of the second shadow area S2 and the small size of the second shadow area S2 may be stored in the storage unit 220. Therefore, the area calculation unit 240 may be configured to determine the position of the second vehicle 2 by referring to the range of the central area PC and then calculate the size of the entire shadow area S by extracting the small size of the second shadow area S2 or the large size of the second shadow area S2. The size of the shadow area S calculated by the area calculation unit 240 may be sent to the light amount adjustment unit 250, and the light amount adjustment unit 250 may adjust the amount of light of the first through sixth light sources 111 through 116 and 121 through 126 included in the light irradiation device 100 such that the shadow area S that corresponds to the received size may be formed.

In addition to setting the size of the second shadow area S2 by referring to whether the second vehicle 2 may be included in the central area PC of the beam pattern P, the control device 200 may be configured to increase the second shadow area S2 to a greater size as the second vehicle 2 moves from the center of the beam pattern P toward the edges of the beam pattern P, as illustrated in FIG. 17.

Figure 18:
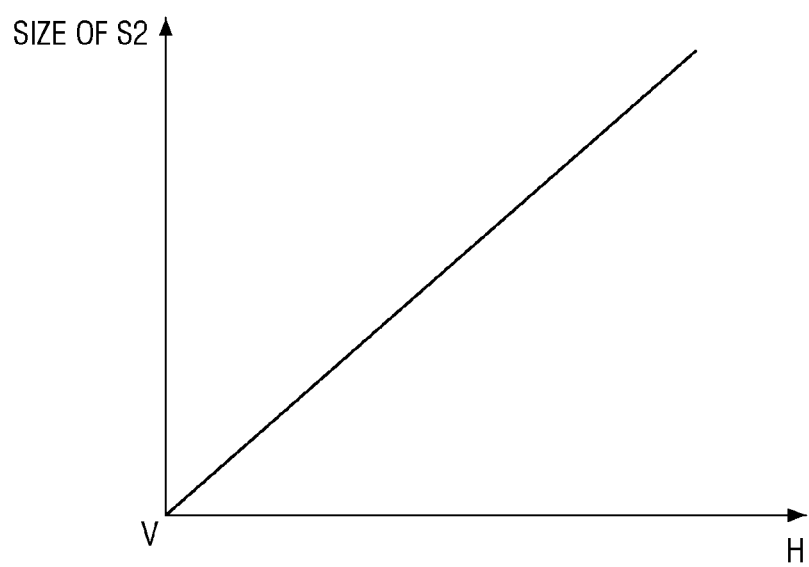
FIGS. 18 and 19 illustrate the exemplary relationship between the size of the second shadow area and the distance from a center of the beam pattern according to an exemplary embodiment of the present disclosure.
Figure 19:
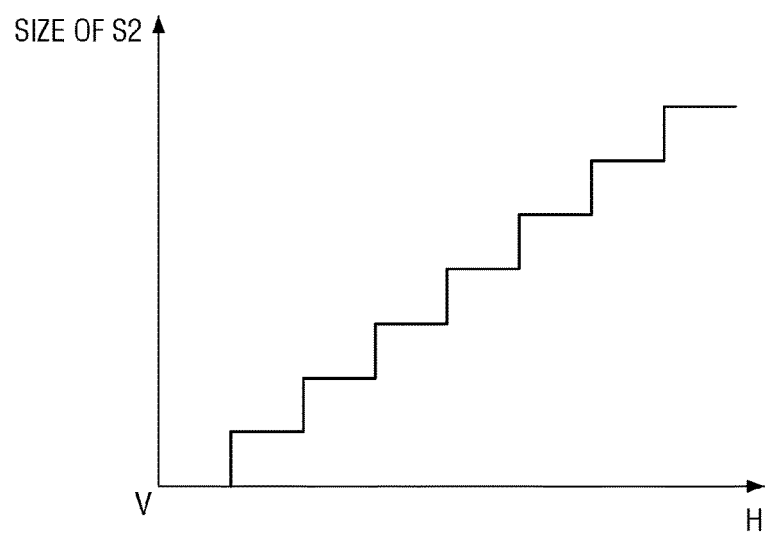

The size of the second shadow area S2 may increase proportionally as illustrated in FIG. 18 or may increase in a pattern including a plurality of steps as illustrated in FIG. 19. FIGS. 18 and 19 illustrate the size of the second shadow area S2 which changes from the center of the beam pattern P toward the edges of the beam pattern P. The storage unit 220 may be configured to store at least one of graphs of FIGS. 18 and 19. The at least one of the graphs of FIGS. 18 and 19 may be stored in the form of a table listing the size of the second shadow area S2 that corresponds to each distance from the center of the beam pattern P or may be stored in the form of a mathematical equation that induces the graph.

The area calculation unit 240 may be configured to calculate the size of the entire shadow area S by calculating the size of the second shadow area S2 using the graph stored in the storage unit 220. For example, the area calculation unit 240 may be configured to calculate the size of the second shadow area S2 using the graph of FIG. 18 or the graph of FIG. 19. The size of the shadow area S calculated by the area calculation unit 240 may be sent to the light amount adjustment unit 250, and the light amount adjustment unit 250 may adjust the amount of light of the first through sixth light sources 111 through 116 and 121 through 126 included in the light irradiation device 100 such that the shadow area S that corresponds to the received size may be formed. The graph used to calculate the size of the second shadow area S2 that corresponds to each distance from the center of the beam pattern P may be not limited to the graphs of FIGS. 18 and 19. Various forms of graphs may also be used to calculate the size of the second shadow area S2.

Figure 20:
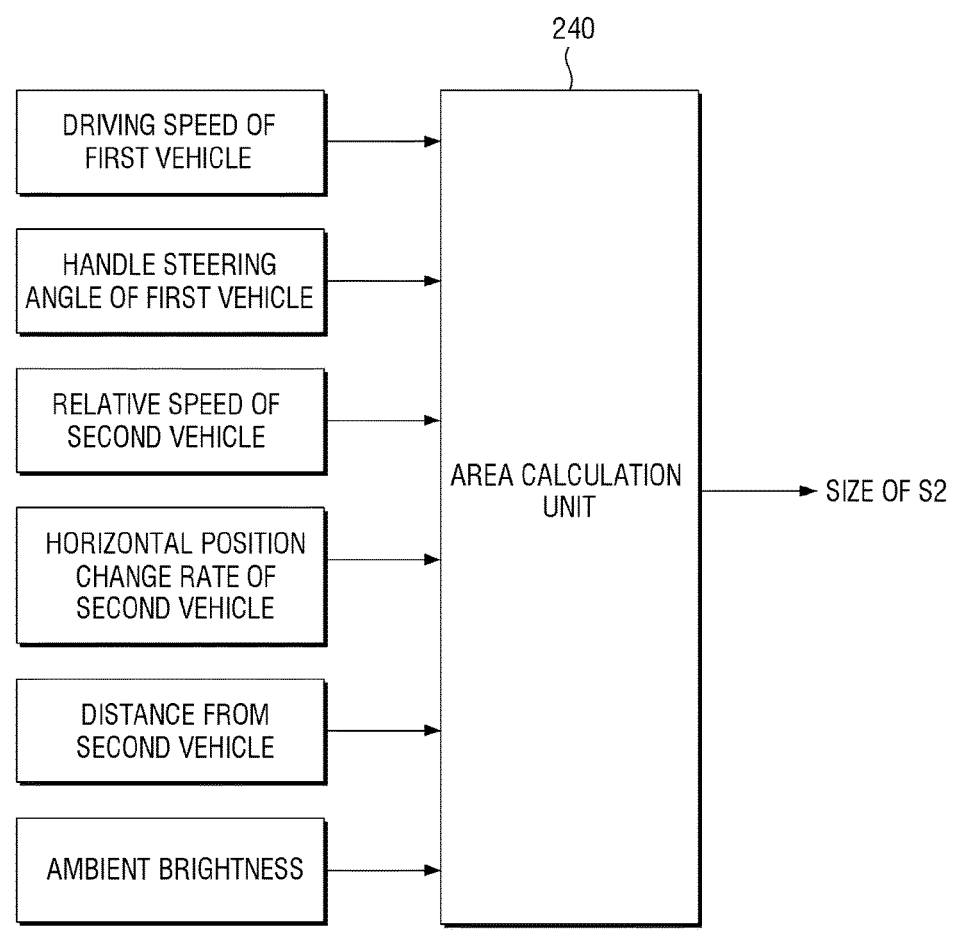
FIG. 20 illustrates exemplary information which determines the size of the second shadow area according to an exemplary embodiment of the present disclosure.

FIG. 20 illustrates information which determines the size of the second shadow area S2 according to an exemplary embodiment. As described above, the control device 200 may be configured to the size of the shadow area S in view of at least one of the information about the first vehicle 1 including the light irradiation device 100, the information about the second vehicle 2, and the information about the surrounding environment. When the second shadow area S2 of the same size is applied without regard to various conditions, sufficient visibility may not be secured for the driver of the first vehicle 1, or the driver of the second vehicle 2 may be subject to glare (e.g., dazzled).

In particular, the information collection unit 210 according to the exemplary embodiment may include various sensing media (not illustrated) configured to sense the first vehicle 1, the second vehicle 2 and the surrounding environment, and the area calculation unit 240 may be configured to calculate the size of the second shadow area S2 by referring to information collected by the information collection unit 210. Since the second shadow area S2 may be set to a different size based on the collected information, it may be possible to secure sufficient visibility for the driver of the first vehicle 1 and prevent the driver of the second vehicle 2 from being subject to glare (e.g., dazzled).

The area calculation unit 240 of the control device 200 may be configured to calculate the size of the second shadow area S2 by referring to the collected information as illustrated in FIG. 20 and set the size of the shadow area S by reflecting the calculated size of the second shadow area S2 in the first shadow area S1. In the disclosure, the information about the first vehicle 1 may include at least one of a driving speed and a handle steering angle of the first vehicle 1. The information about the second vehicle 2 may include at least one of a relative speed of the second vehicle 2, a horizontal position change rate of the second vehicle 2, and a distance from the second vehicle 2. The information about the surrounding environment may include ambient brightness.

The above information may be collected by the information collection unit 210. Since the information has been described above, a detailed description of the information will be omitted. The above information is merely an example, and information used by the area calculation unit 240 to calculate the size of the second shadow area S2 is not limited to the above information. The information collection unit 210 may collect additional information and the area calculation unit 240 may calculate the size of the second shadow area S2 by referring to the additional information. The area calculation unit 240 may set the size of the shadow area S by referring to the collected information. For example, the area calculation unit 240 may be configured to increase the shadow area S to a greater size as the handle steering angle increases, as the relative speed of the second vehicle 2 increases, as the horizontal position change rate of the second vehicle 2 increases, as the distance from the second vehicle 2 decreases, and as the ambient brightness decreases.

However, the above algorithm for setting the size of the shadow area S based on information is merely an example, and the area calculation unit 240 may also set the size of the shadow area S for each piece of information using other algorithms. For example, the area calculation unit 240 may set the shadow area S to a larger size as the ambient brightness may be higher. The size of the shadow area S calculated by the area calculation unit 240 may be configured to set the light amount adjustment unit 250, and the light amount adjustment unit 250 may be configured to adjust the amount of light of the first through sixth light sources 111 through 116 and 121 through 126 included in the light irradiation device 100 to form the shadow area S that corresponds to the received size.

Figure 21:
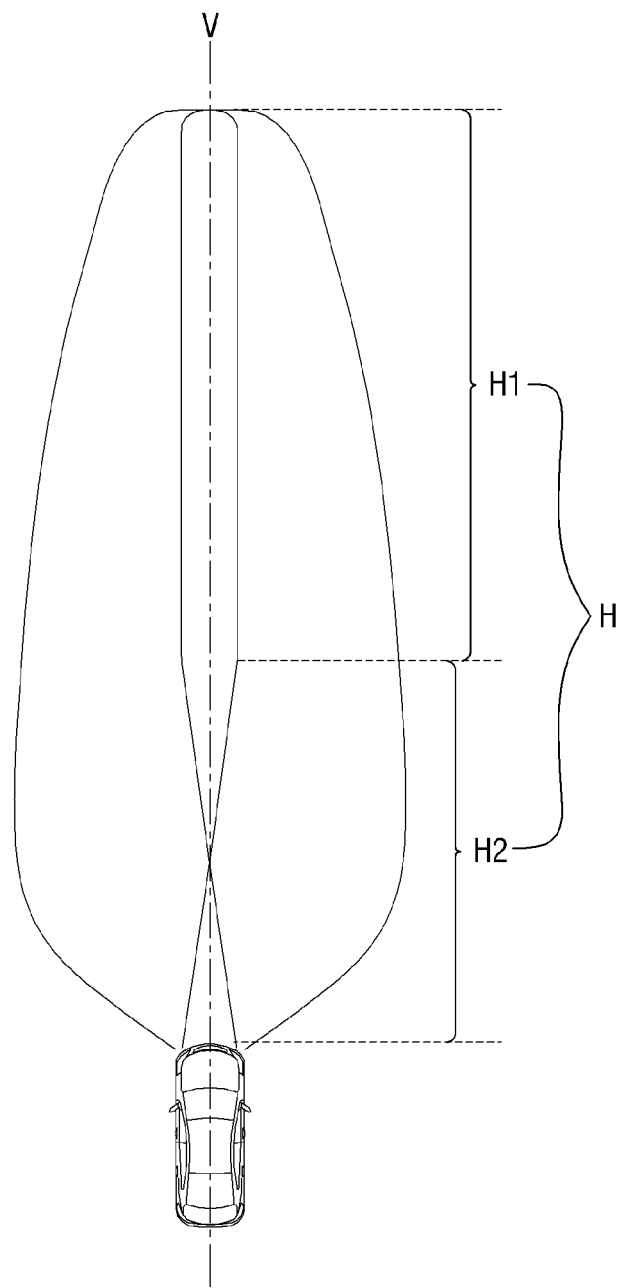
FIG. 21 illustrates an exemplary light irradiation section according to an exemplary embodiment of the present disclosure.

FIG. 21 illustrates a light irradiation section H according to an exemplary embodiment. Referring to FIG. 21, the light irradiation section H may include a uniform overlap section H1 and a non-uniform overlap section H2. The uniform overlap section H1 may be a section in which the first pattern P1 and the second pattern P2 overlap each other in a uniform manner along the centerline V of the first vehicle 1. As illustrated in FIG. 21, the first pattern P1 and the second pattern P2 overlap each other to a uniform degree in the uniform overlap section H1. The non-uniform overlap section H2 may be a section in which the first pattern P1 and the second pattern P2 overlap each other in a non-uniform manner along the centerline V of the first vehicle 1. As illustrated in FIG. 21, the first pattern P1 and the second pattern P2 may overlap each other to a non-uniform degree or may not overlap each other in the non-uniform overlap section H2. The light irradiation section H excluding the uniform overlap section H1 may be the non-uniform overlap section H2.

Figure 22:
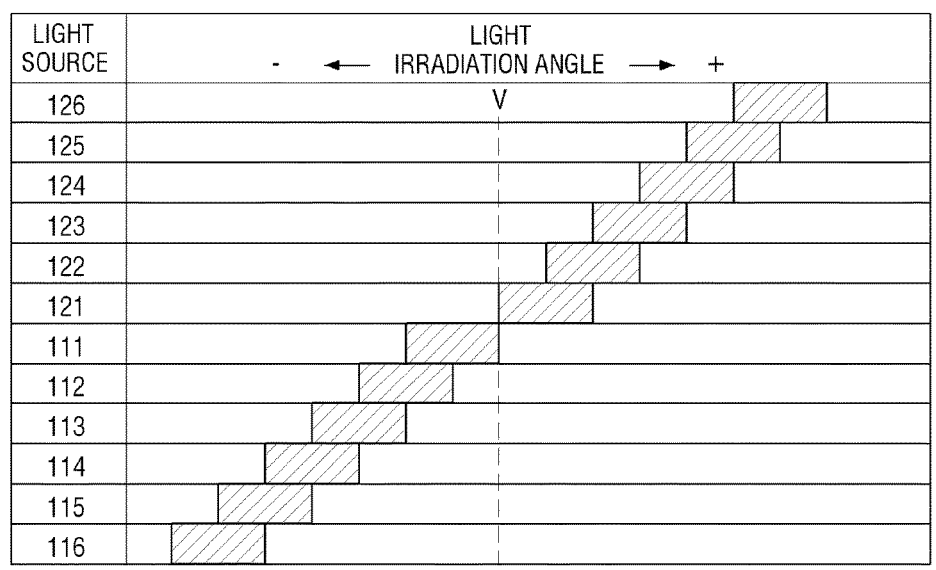
FIG. 22 illustrates exemplary light irradiation angles at a point at which the first pattern and the second pattern cross each other according to an exemplary embodiment of the present disclosure.

The light irradiation angles of the first through sixth light sources 111 through 116 and 121 through 126 illustrated in FIG. 9 are light irradiation angles for the uniform overlap section H1. Light irradiation angles in the entire uniform overlap section H1 may be maintained similarly to those of FIG. 9. Therefore, when the second vehicle 2 enters the uniform overlap section H1, the shadow area S may be formed by adjusting the amount of light of specific light sources with reference to the light irradiation angles of FIG. 9. Light irradiation angles in the non-uniform overlap section H2 may be different from those of FIG. 9. For example, the light irradiation angles of the first through sixth light sources 111 through 116 and 121 through 126 at a point at which the first pattern P1 and the second pattern P2 cross each other may be as illustrated in FIG. 22. In addition, the light irradiation angles in the non-uniform overlap section H2 may vary based on the distance from the first vehicle 1.

In particular, the light irradiation angles in the uniform overlap section H1 may be different from the light irradiation angles in the non-uniform overlap section H2. Therefore, when the second vehicle 2 enters the non-uniform overlap section H2, when the amount of light of one or more light sources may be adjusted using the light irradiation angles in the uniform overlap section H1, a correct shadow area S cannot be formed.

Figure 23:
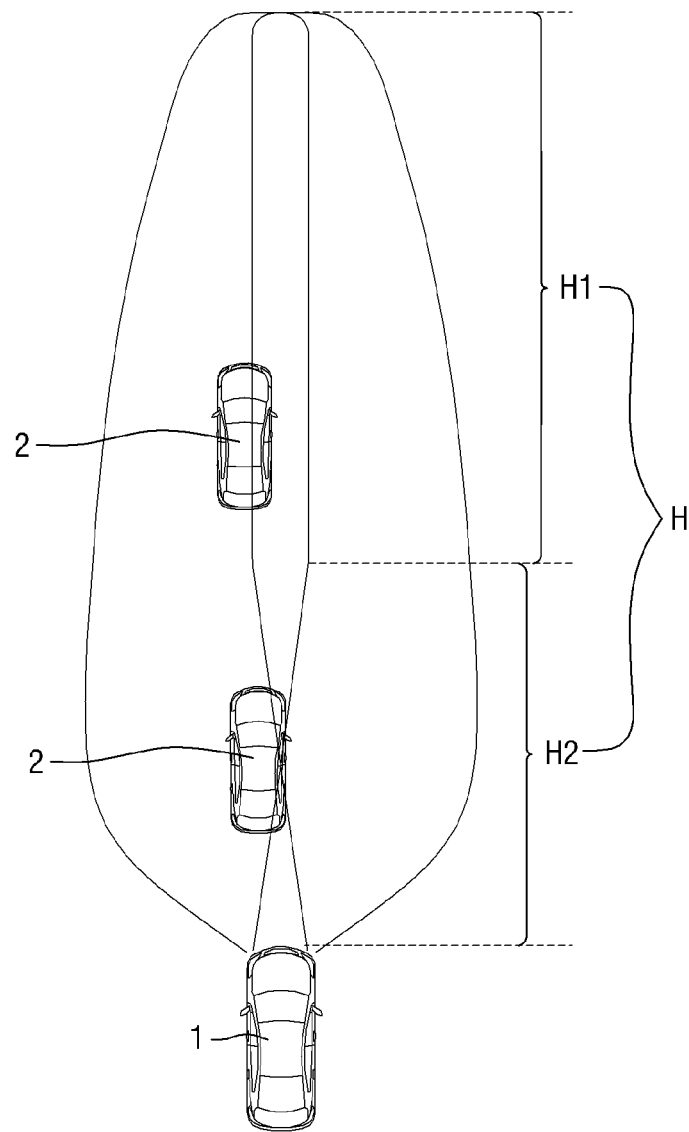
FIG. 23 illustrates exemplary second vehicles entering the light irradiation section according to an exemplary embodiment of the present disclosure.
Figure 24:
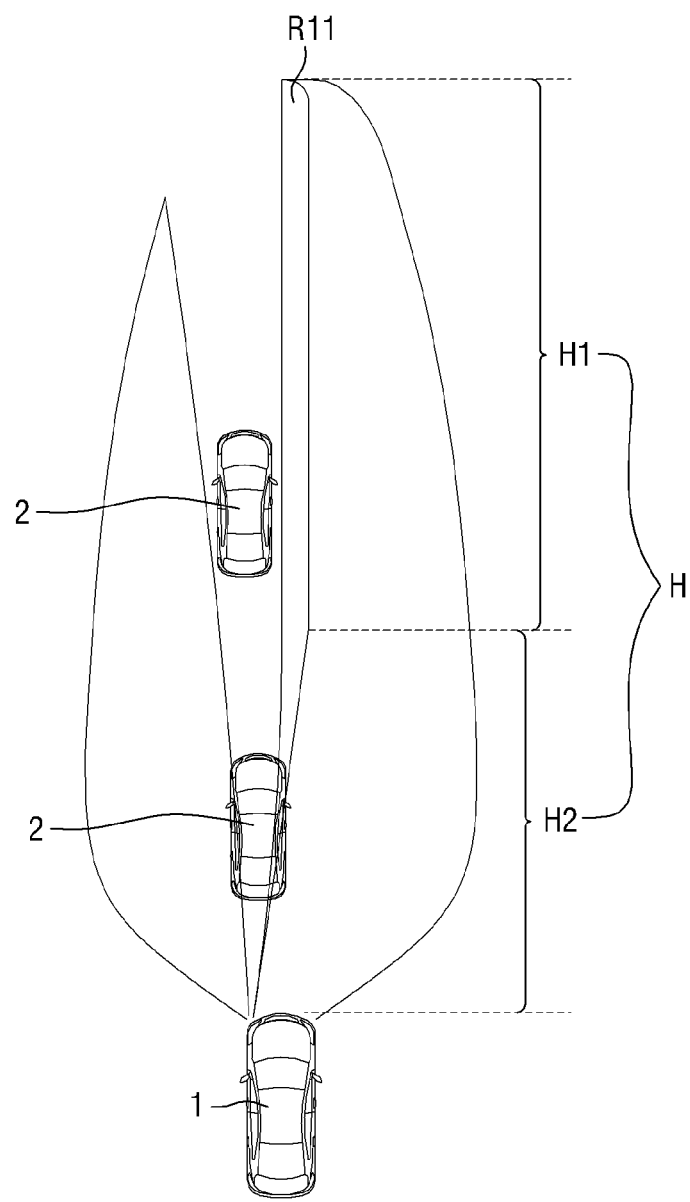
FIG. 24 illustrates an exemplary road pattern formed when second vehicles enter the light irradiation section according to an exemplary embodiment of the present disclosure.

FIG. 23 illustrates second vehicles 2 entering the light irradiation section H according to an exemplary embodiment. Referring to FIG. 23, the second vehicles 2 enter the uniform overlap section H1 and the non-uniform section H2 to be located at the same horizontal position with respect to the first vehicle 1 but at different distances from the first vehicle 1. Since the positions of the second vehicles 2 perceived by the first vehicle 1 are similar, the control device 200 may be configured to adjust the same beam pattern P to be formed for the second vehicles 2. Here, when the amount of light of one or more light sources may be adjusted based on the light irradiation angles of FIG. 9, a lighting pattern may be formed as illustrated in FIG. 24. For example, the control device 200 may form a shadow area S by turning the first light source 121 and the second light source 122 of the second light irradiator 120 off and turning the second light source 112 and the third light source 113 of the first light irradiator 110 off.

Referring to FIG. 24, a normal shadow area S may be formed for the second vehicle 2 in the uniform overlap section H1 by the light amount adjustment of the control device 200. On the other hand, a normal shadow area S may not be formed for the second vehicle 2 in the non-uniform overlap area H2. Since the first light source 111 of the first light irradiator 110 is not turned off, light R11 of the first light source 111 may be irradiated to the second vehicle 2 in the non-uniform overlap section H2 as illustrated in the drawing. In particular, when the second vehicle 2 which entered the non-uniform overlap section H2 may be positioned adjacent to an overlap area between the first pattern P1 and the second pattern P2, a normal shadow area S may not be formed for the second vehicle 2, and thus light may be irradiated to the second vehicle 2. In the disclosure, the second vehicle 2 adjacent to the overlap area may be a preceding vehicle driving in the same direction as the first vehicle 1.

Although a shadow area S may be formed, light may still be irradiated to the second vehicle 2 which entered the non-uniform section H2 because the light irradiation angles of the first through sixth light sources 111 through 116 and 121 through 126 are different in the uniform overlap section H1 and the non-uniform overlap section H2 of the light irradiation section H. In particular, even when the second vehicle 2 enters the non-uniform overlap section H2, the shadow area S may be formed by adjusting the amount of light of one or more light sources using the light irradiation angles in the uniform overlap section H1. Therefore, a normal shadow area S cannot be formed for the second vehicle 2 which entered the non-uniform section H2.

Accordingly, the shadow area S for the non-uniform overlap section H2 may be formed by applying light irradiation angles for the non-uniform overlap section H2. However, in the non-uniform overlap section H2, the overlap pattern varies based on the distance from the first vehicle 1. Therefore, light irradiation angles may be calculated for each distance from the first distance 1. In this case, since different light irradiation angles may be applied by continuously sensing the distance from the second vehicle 2, high computational performance is required.

In this regard, the control device 200 according to the exemplary embodiment may set the size of the shadow area S by referring to whether the second vehicle 2 exists in the non-uniform overlap section H2 of the light irradiation section H in which the first pattern P1 and the second pattern P2 overlap each other to a non-uniform degree. Whether the second vehicle 2 exists in the non-uniform overlap section H2 may be determined by comparing the distance from the second vehicle 2 with a length of the non-uniform overlap section H2.

As described above, the information collection unit 210 of the control device 200 may sense the distance from the second vehicle 2. When the distance from the second vehicle 2 may be shorter than the length of the non-overlap section H2, the control device 200 may determine that the second vehicle 2 exists in the non-uniform overlap section H2 and adjust the amount of light of the first through sixth light sources 111 through 116 and 121 through 126 included in the light irradiation device 100 based on the determination result.

Figure 25:
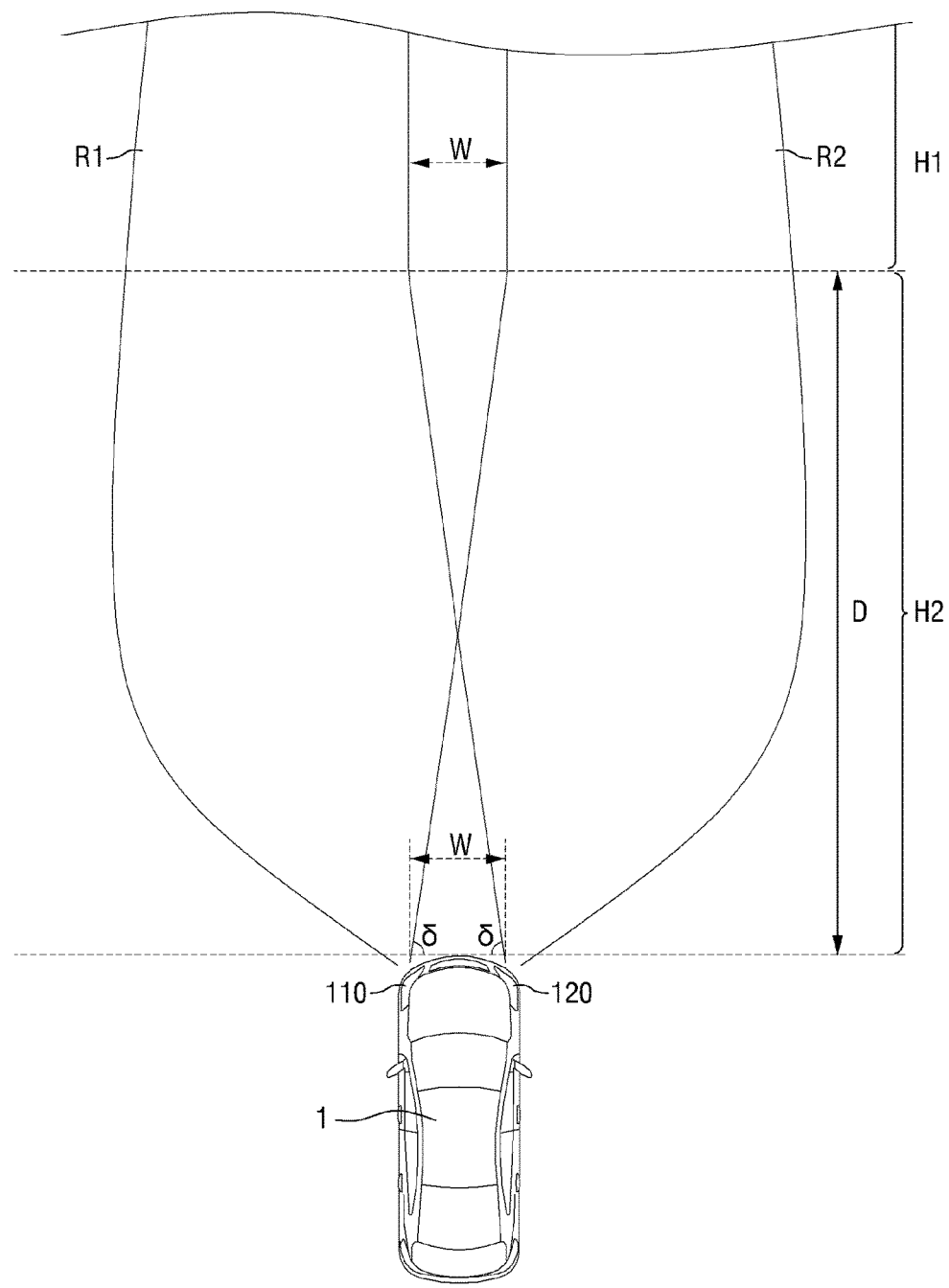
FIG. 25 illustrates an exemplary non-uniform overlap section according to an exemplary embodiment of the present disclosure.

FIG. 25 illustrates a non-uniform overlap section H2 according to an exemplary embodiment. Referring to FIG. 25, a gap between the first light irradiator 110 and the second light irradiator 120 may be W, and a light irradiation direction of each of the first light irradiator 110 and the second light irradiator 120 has an angle of δ with respect to a horizontal virtual line. For example, the horizontal virtual line may be an extension line connecting the first light irradiator 110 and the second light irradiator 120 or may be parallel to the extension line. In addition, in FIG. 25, a width W of an overlap area between the first road pattern R1 and the second road pattern R2 may be equal to the gap W between the first light irradiator 110 and the second light irradiator 120. In this case, a length D of the non-uniform overlap section H2 may be given by D=W tan δ.

W and δ may be stored in advance. For example, the storage unit 220 of the control device 200 may store W and δ. The control device 200 may be configured to calculate the length D of the non-uniform overlap section H2 using the pre-stored W and δ and determine whether the second vehicle 2 exists in the non-uniform overlap section H2 by comparing the length D of the non-uniform overlap section H2 and the distance from the second vehicle 2. Alternatively, the length D of the non-uniform overlap section H2 may be stored in advance. In this case, the control device 200 may be configured to determine whether the second vehicle 2 exists in the non-uniform overlap section H2 by comparing the stored length D and the distance from the second vehicle 2.

The distance from the second vehicle 2 which is sensed by the information collection unit 210 may be less than a distance from an exterior surface of the second vehicle 2 to the first vehicle 1. For example, when the second vehicle 2 may be a preceding vehicle driving in the same direction as the first vehicle 1, the distance from the second vehicle 2 may be a distance from a rear end of the second vehicle 2 to the first vehicle 1. When the second vehicle 2 may be an oncoming vehicle driving in an opposite direction to the driving direction of the first vehicle 1, the distance from the second vehicle 2 may be a distance from a front end of the second vehicle 2 to the first vehicle 1. Therefore, even when the distance from the second vehicle 2 may be less than the length D of the non-uniform overlap section H2, not the whole of the body of the second vehicle 2 may be included in the non-uniform overlap section H2, but only portion of the body of the second vehicle 2 may be included in the non-uniform overlap section H2.

Accordingly, the control device 200 may be configured to determine whether the second vehicle 2 exists in the non-uniform overlap section H2 by reflecting an extra length that corresponds to the length of the body of the second vehicle 2. In particular, when the sum of the distance from the second vehicle 2 and the extra length may be less than the length of the non-uniform overlap section H2, the control device 200 may be configured to determine that the second vehicle 2 exists in the non-uniform overlap section H2. For example, the extra length may be a preset fixed value stored in the storage unit 220. Alternatively, without taking the extra length into consideration, the control device 200 may be configured to determine that the second vehicle 2 exists in the non-uniform overlap section H2 when the distance from the second vehicle 2 may be less than the length of the non-uniform overlap section H2.

When the second vehicle 2 exists in the non-uniform overlap section H2, the control device 200 may be configured to control the light irradiation device 100 such that at least one light source that corresponds to the overlap area between the first pattern P1 and the second pattern P2 among the first through sixth light sources 111 through 116 and 121 through 126 included in the light irradiation device 100 does not irradiate light. Alternatively, when the second vehicle 2 exists in the non-uniform overlap section H2, the control device 200 may be configured to control the light irradiation device 100 such that the amount of light irradiated from at least one light source that corresponds to the overlap area between the first pattern P1 and the second pattern P among the first through sixth light sources 111 through 116 and 121 through 126 included in the light irradiation device 100 may be reduced.

For example, the control device 200 may be configured to control the light irradiation device 200 such that the first and second light sources 111 and 112 of the first light irradiator 110 and the first and second light sources 121 and 122 of the second light irradiator 120 do not irradiate light or that the amount of light irradiated from the first and second light sources 111 and 112 of the first light irradiator 110 and the first and second light sources 121 and 122 of the second light irradiator 120 may be reduced. As the amount of light of the first and second light sources 111 and 112 of the first light irradiator 110 and the amount of light of the first and second light sources 121 and 122 of the second light irradiator 120 are adjusted, a basic shadow area BS may be formed as illustrated in FIG. 26.

Figure 26:
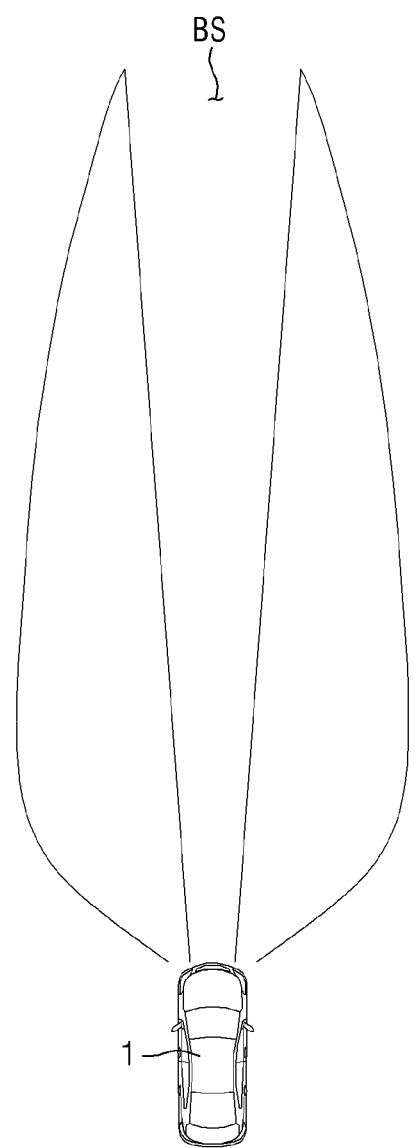
FIG. 26 illustrates an exemplary basic shadow area formed when a second vehicle enters the non-uniform overlap section according to an embodiment of the present disclosure.

FIG. 26 illustrates a basic shadow area BS formed when a second vehicle 2 enters the non-uniform overlap section H2. The basic shadow area BS may be a shadow area basically formed when the second vehicle 2 enters the non-uniform overlap section H2. An additional shadow area may be added to the basic shadow area BS according to the position of the second vehicle 2, thereby forming a complete shadow area S. For example, the entire shadow area S may be formed by adjusting the amount of light of the third light source 113 of the first light irradiator 110 in a state where the basic shadow area BS may be formed.

As described above, when the second vehicle 2 which entered the non-uniform overlap section H2 may be adjacent to the overlap area between the first pattern P1 and the second pattern P2, a normal shadow area S may not be formed for the second vehicle 2, and thus light may be irradiated to the second vehicle 2. Therefore, the control device 200 may form the basic shadow area BS by adjusting the amount of light of one or more light sources that corresponds only to the overlap area between the first pattern P1 and the second pattern P2. The light sources that correspond to the overlap area are not limited to the first light sources 111 and 121 and the second light sources 112 and 112. More light sources may be added, or only the first light sources 111 and 121 may be used.

Figure 27:
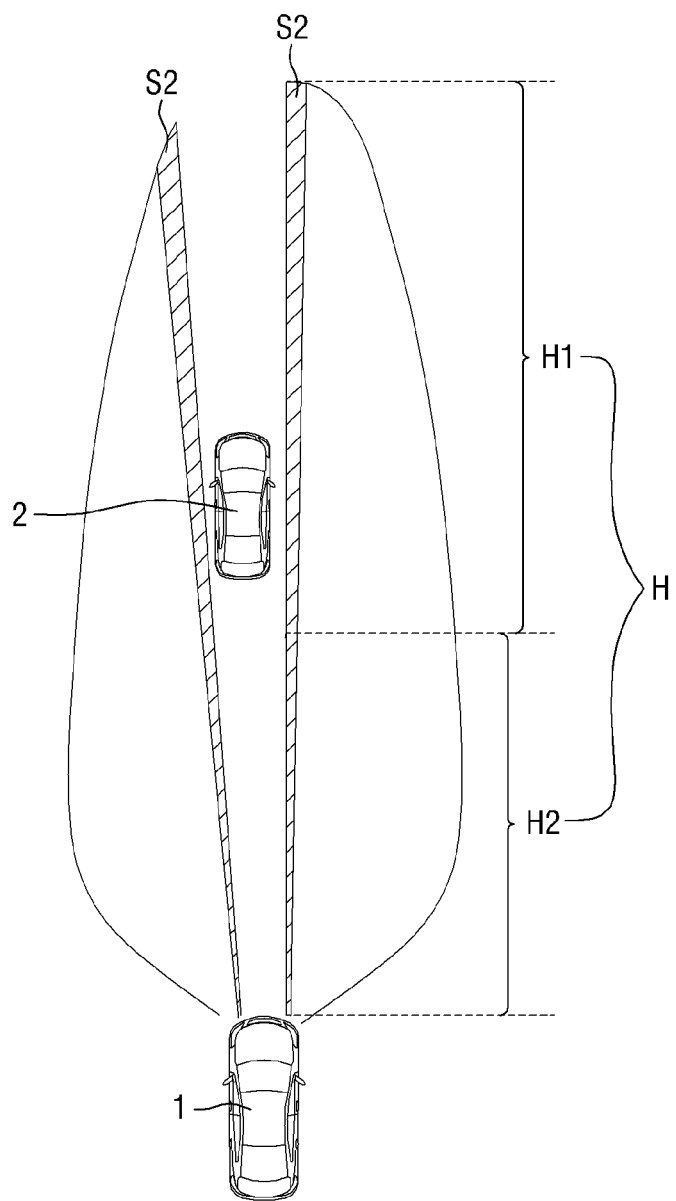
FIGS. 27 and 28 illustrate the exemplary size of the second shadow area in each of the uniform overlap section and the non-uniform overlap section of the light irradiation section according to an exemplary embodiment of the present disclosure.
Figure 28:
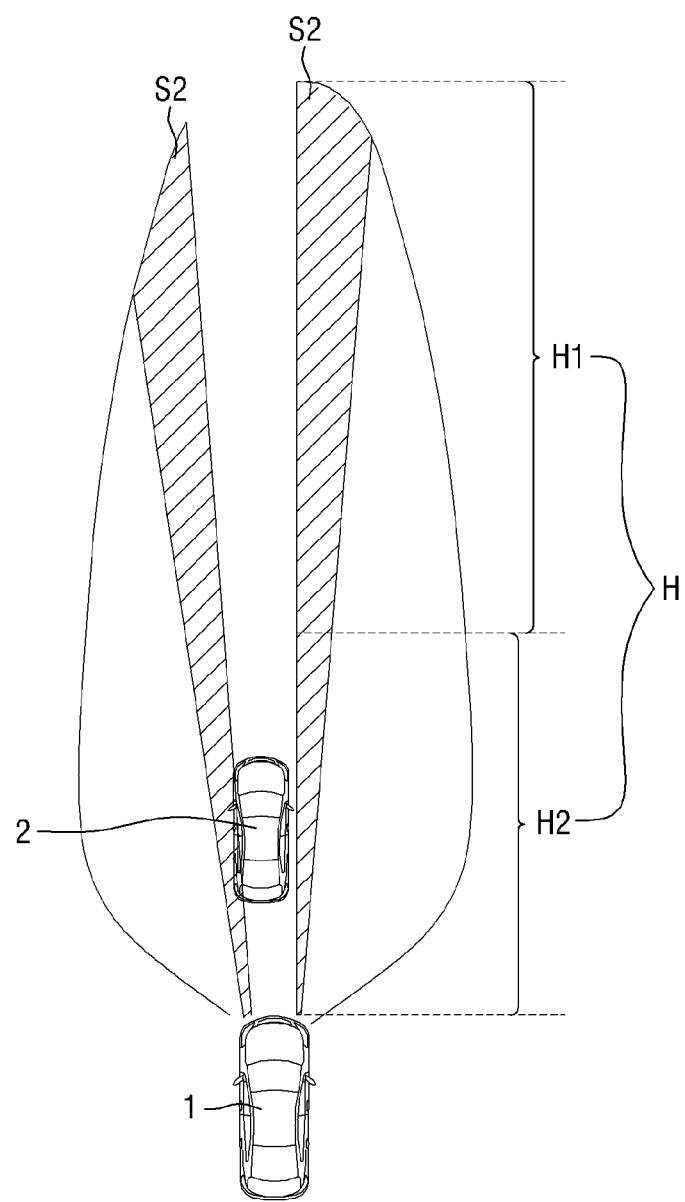

FIGS. 27 and 28 illustrate the size of the second shadow area S2 in each of the uniform overlap section H1 and the non-uniform overlap section H2 of the light irradiation section H according to an exemplary embodiment. Referring to FIGS. 27 and 28, the control device 200 may be configured to increase the second shadow area S2 to a greater size when a second vehicle 2 exists in the non-uniform overlap section H2 of the light irradiation section H than when the second vehicle 2 exists in the uniform overlap section H1 of the light irradiation section H. Since the second shadow area S2 may be set to a greater size in the non-uniform overlap section H2, the irradiation of light to the second vehicle 2 may be prevented.

For example, as illustrated in FIG. 24, light emitted from the first light source 111 of the first light irradiator 110 may be irradiated to the second vehicle 2 existing in the non-uniform overlap section H2. In this case, when the second shadow area S2 may be increase to a greater size, the amount of light of the first light source 111 of the first light irradiator 110 may be adjusted. As described above, by adjusting the amount of light of one or more light sources that corresponds to the overlap area between the first pattern P1 and the second pattern P2 or by setting the second shadow area S2 to a relatively greater size in the non-uniform overlap section H2, it may be possible to prevent light from being irradiated to the second vehicle 2 existing in the non-uniform overlap section H2 while applying the light irradiation angles of FIG. 9.

Figure 29:
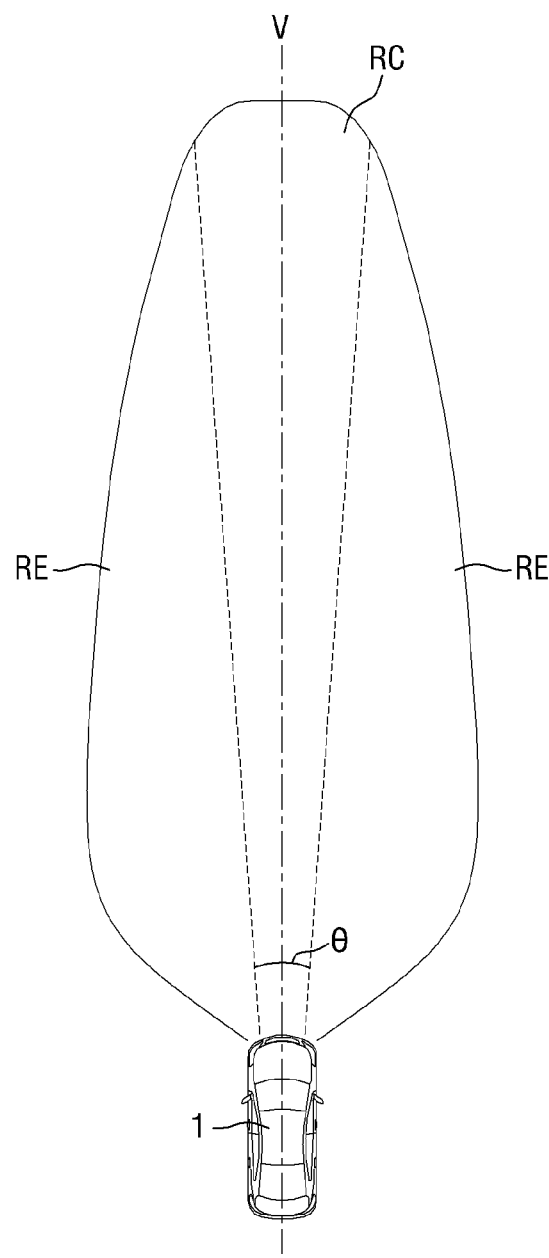
FIG. 29 illustrates an exemplary road pattern divided by a centerline of a first vehicle according to an exemplary embodiment of the present disclosure.

FIG. 29 illustrates the road pattern R divided by the centerline V of the first vehicle 1 according to an exemplary embodiment. Referring to FIG. 29, the road pattern R may include a central road area RC including the centerline V of the first vehicle 1 and a peripheral road area RE not including the centerline V. For example, an area extending from the centerline V, i.e., a central axis to the left and right by a specific angle may be the central road area RC, and an area external to the central road area RC may be the peripheral road area PE. In FIG. 29, the central road area RC may include a light irradiation angle of about $\theta$.

Figure 30:
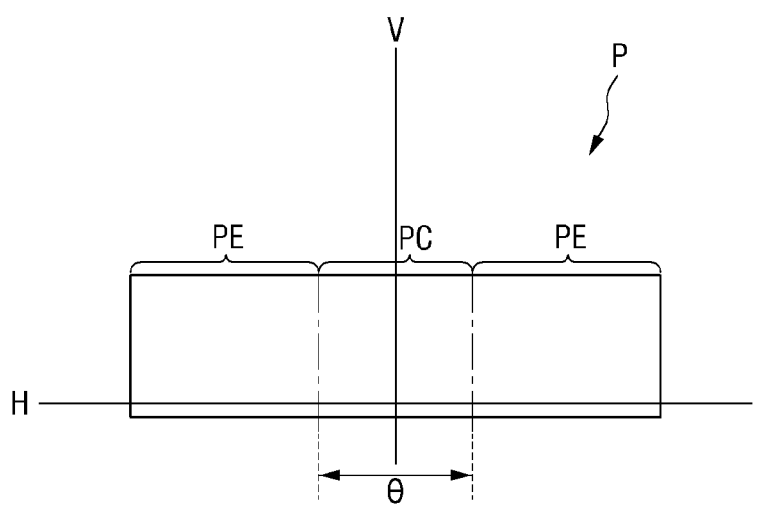
FIG. 30 illustrates an exemplary beam pattern divided by the centerline of the first vehicle according to an exemplary embodiment of the present disclosure.

The road pattern R illustrated in FIG. 29 may be converted into a beam pattern P illustrated in FIG. 30. FIG. 30 illustrates the beam pattern P divided by the centerline V. The beam pattern P may include a central area PC having a preset light irradiation angle with respect to a central axis of light irradiated by the light irradiation device 100. In other words, with respect to the centerline V and a peripheral area PE positioned external to the central area PC. In FIG. 30, the central area PC having a light irradiation angle of $\theta$ and the peripheral area PE adjacent to the central area PC are illustrated.

The central area PC may be an area having a relatively high luminosity, and the peripheral area PE may be an area having a relatively low luminosity. In particular, the central area PC may have high luminosity because it includes the overlap area between the first pattern P1 and the second pattern P2. When a second vehicle 2 exists in the central area PC, the driver of the second vehicle 2 may be subject to significant glare. Conversely, when the second vehicle 2 exists in the peripheral area PE, the driver of the second vehicle 2 the glare may be reduced. Furthermore, even when the second vehicle 2 exists in the peripheral area PE, when the distance between the first vehicle 1 and the second vehicle 2 may be great, the field of vision of the driver of the second vehicle 2 may not be impacted.

Therefore, while a shadow area may be formed when the second vehicle 2 exists in the central area PC, it may not be essential to form a shadow area when the second vehicle 2 exists in the peripheral area PE. When a shadow area is unnecessarily formed in a state where the driver of the second vehicle 2 is not subject to glare, the driver of the first vehicle 1 may be distracted. Therefore, the control device 200 according to the exemplary embodiment may be configured to determine whether to form a shadow area by referring to the position of the second vehicle 2 in the area of the beam pattern P. In particular, the control device 200 may be configured to adjust the light irradiation device 100 to form a shadow area when the second vehicle 2 is included in the central area PC.

When the second vehicle 2 is included in the peripheral area PE, the control device 200 may be configured to determine whether to form a shadow area by referring to the distance from the second vehicle 2. In particular, when the second vehicle 2 is included in the peripheral area PE and when the distance from the second vehicle 2 is within a threshold distance, the control device 200 may be configured to adjust the light irradiation device 100 to form a shadow area. When the distance from the second vehicle 2 is equal to or greater than the threshold distance, the control device 200 may control the light irradiation device 100 to not form a shadow area. The threshold distance may be a fixed value or a variable value that varies according to situation. The threshold distance that varies according to situation will be described later with reference to FIG. 33.

Figure 31:
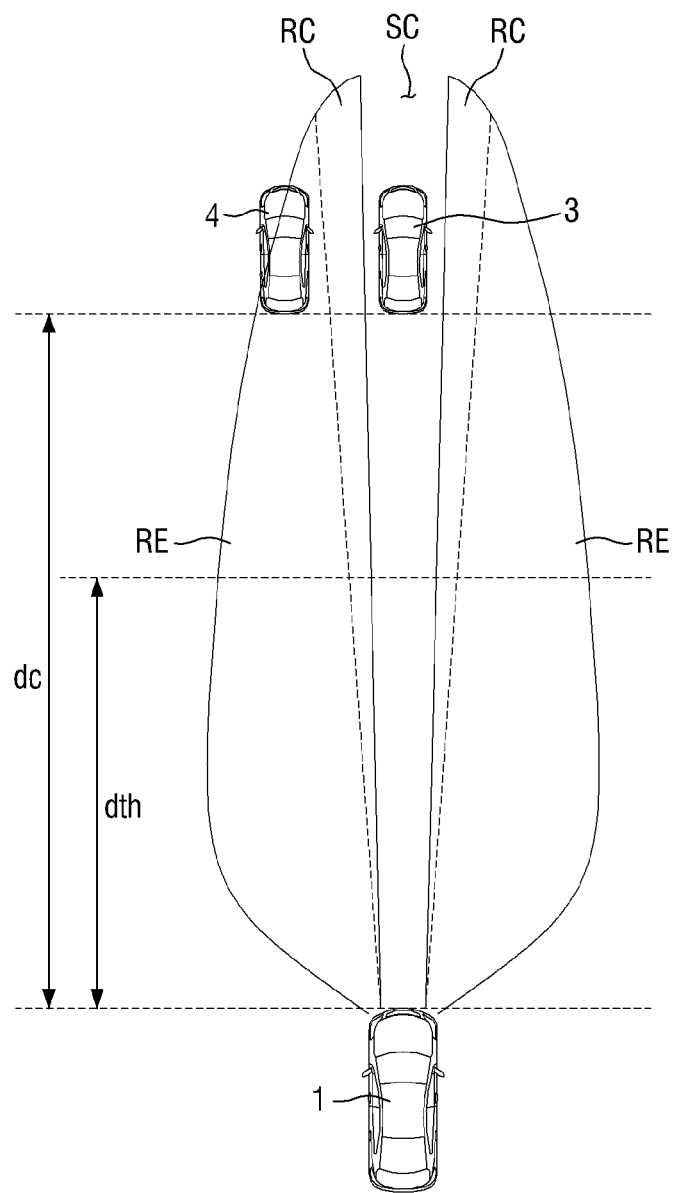
FIG. 31 illustrates an exemplary shadow area formed when the distance from a second vehicle is equal to or greater than a threshold distance according to an exemplary embodiment of the present disclosure.
Figure 32:
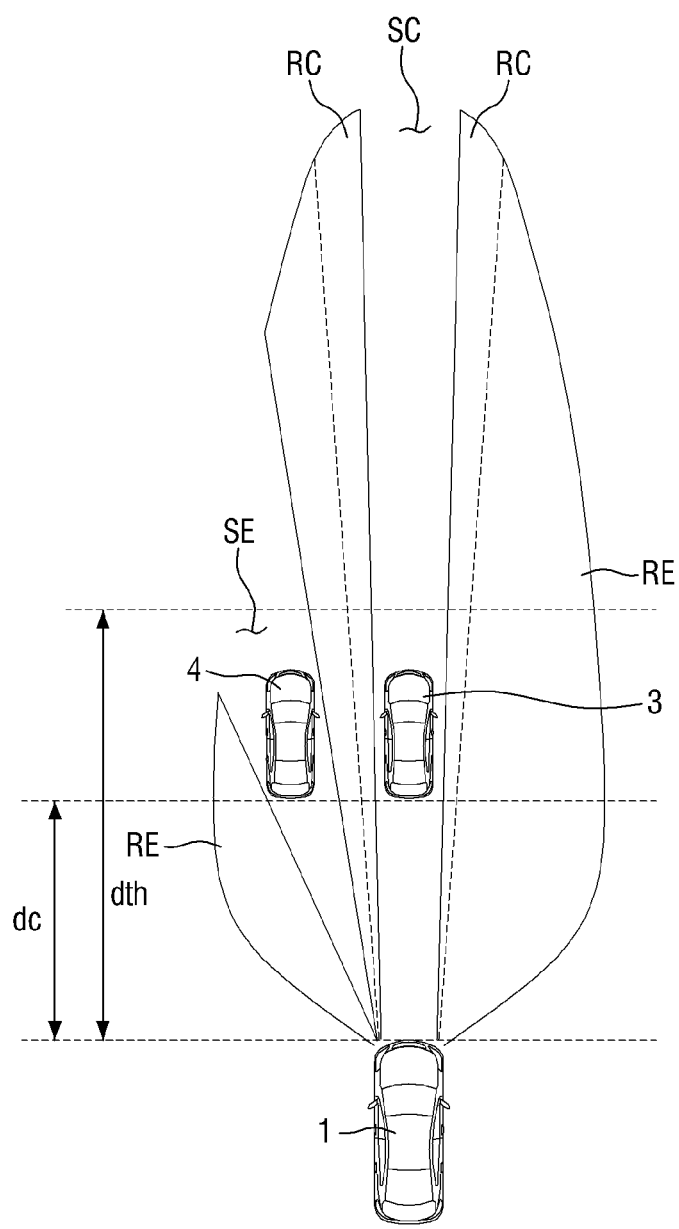
FIG. 32 illustrates an exemplary shadow area formed when the distance from a second vehicle is smaller than the threshold distance according to an exemplary embodiment of the present disclosure.

FIG. 31 illustrates a shadow area formed when the distance from a second vehicle may be equal to or greater than a threshold distance according to an exemplary embodiment. FIG. 32 illustrates a shadow area formed when the distance from a second vehicle may be smaller than the threshold distance according to an exemplary embodiment. Referring to FIGS. 31 and 32, when a second vehicle 3 exists in the central road area RC that corresponds to the central area PC, a shadow area SC may be formed. When the second vehicle 3 exists in the central road area RC, the control device 200 may be configured to control the light irradiation device 100 to form the shadow area SC regardless of the distance from the second vehicle 3.

On the other hand, when a second vehicle 4 exists in the peripheral road area RE that corresponds to the peripheral area PE, the control device 200 may first determine a distance dc from the second vehicle 4. The distance dc from the second vehicle 4 may be calculated by the information collection unit 210. The information collection unit 210 may be configured to calculate the distance dc from the second vehicle 4 through image analysis and calculate the distance dc from the second vehicle 4 using an ultrasonic sensor, an infrared sensor, or a laser sensor.

Once the distance dc from the second vehicle 4 may be calculated, the control device 200 compares the distance dc from the second vehicle 4 with a threshold distance dth. When the distance dc from the second vehicle 4 is equal to or greater than the threshold distance dth as illustrated in FIG. 31, the control device 200 may not form a shadow area for the second vehicle 4 existing in the peripheral road area RE. On the other hand, when the distance dc from the second vehicle 4 is less than the threshold distance dth as illustrated in FIG. 32, the control device 200 may form a shadow area SE for the second vehicle 4 existing in the peripheral road area RE.

In particular, when the second vehicle 4 exists in the peripheral road area RE, that is, the peripheral area PE, whether to form a shadow area may be determined based on the distance dc from the second vehicle 4. Therefore, the driving environment may be improved for the driver of the second vehicle 4 and for the driver of the first vehicle 1.

Figure 33:
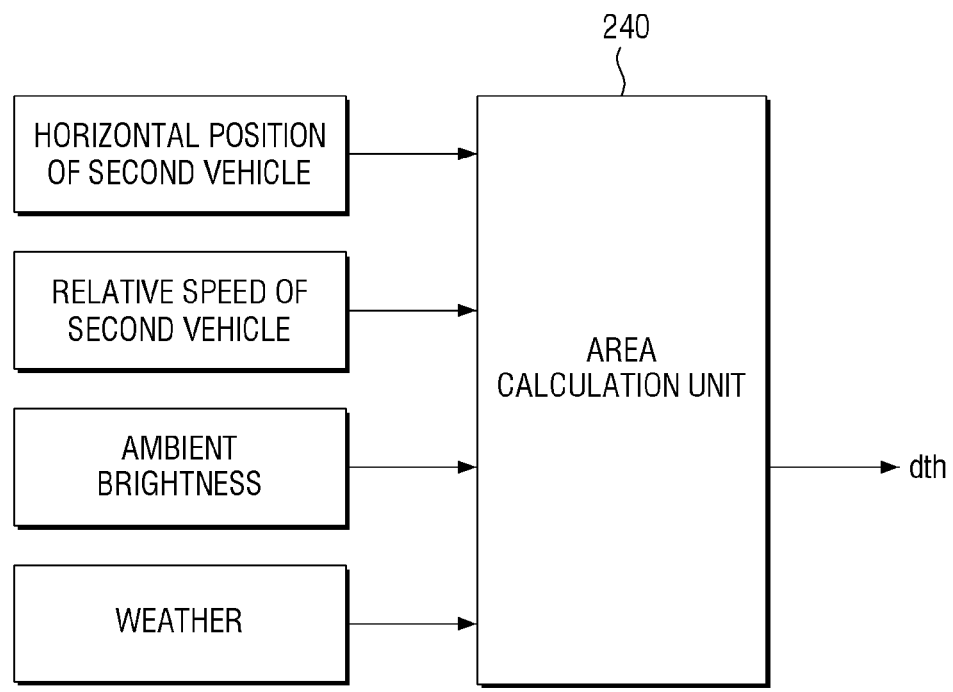
FIG. 33 illustrates exemplary conditions that determine the threshold distance according to an exemplary embodiment of the present disclosure.

FIG. 33 illustrates conditions that determine the threshold distance dth according to an exemplary embodiment. Referring to FIG. 33, the area calculation unit 240 may be configured to determine the threshold distance dth in view of at least one of the horizontal position of a second vehicle, the relative speed of the second vehicle, ambient brightness, and weather. The horizontal position of the second vehicle may be understood as the distance of the second vehicle from the centerline V of the first vehicle 1. For example, the area calculation unit 20 may be configured to determine the threshold distance dth in proportion to the distance of the second vehicle from the centerline V.

The relative speed of the second vehicle may be the speed of the second vehicle based on the speed of the first vehicle 1. In particular, the relative speed may be understood as the speed of the second vehicle sensed at the position of the first vehicle 1. For example, the area calculation unit 240 may be configured to determine the threshold distance dth in proportion to the relative speed of the second vehicle. Ambient brightness and weather are information about the surrounding environment sensed by the information collection unit 210. For example, the area calculation unit 240 may be configured to determine the threshold distance dth in proportion to ambient brightness. In addition, the area calculation unit 240 may be configured to determine a relatively greater threshold distance dth when the weather is clear than when the weather is cloudy.

Determining the threshold distance dth based on the above conditions is merely an example, and the area calculation unit 240 may also determine the threshold distance dth in an opposite way or other ways. Until now, a plurality of operation modes of the control device 200 have been described. The operation modes include a mode for setting the size of a shadow area by referring to the position of a second vehicle 2 in the beam pattern P, a mode for setting the size of the shadow area by referring to collected information, a mode for setting the size of the shadow area according to whether the second vehicle 2 exists in the non-uniform overlap section H2, and a mode for determining whether to form the shadow area by referring to the position of the second vehicle 2 in the beam pattern P. The control device 200 may form a shadow area by applying only one operation mode or a combination of a plurality of operation modes.

An automotive lamp and a method of controlling the same according to an exemplary embodiment the disclosure provide at least one of the following advantages. First, glare to the drivers of second vehicles may be reduced by controlling a light pattern of irradiated light. Therefore, a safer driving environment may be provided. Second, a light pattern may be adjusted in view of various factors. This not only reduces glare to the drivers of second vehicles but also secures sufficient visibility for the driver of a first vehicle.

Hereinabove, although the present disclosure has been described with reference to exemplary embodiments and the accompanying drawings, the present disclosure is not limited to the disclosed embodiments. On the contrary, it is intended to cover, various modifications and equivalents arrangements by those skilled in the art to which the present disclosure pertains without departing from the spirit and scope of the present disclosure claimed in the following claims.

The invention claimed is:

1. An automotive lamp, comprising:
a light irradiation device configured to form a first pattern and a second pattern that at least partially overlap each other by irradiating light; and
a control device configured to adjust the light irradiation device to form a shadow area at a position of a second vehicle when the second vehicle exists in an area of a beam pattern in which the first pattern and the second pattern are synthesized with each other,
wherein the control device is configured to determine a size of the shadow area by referring to whether the second vehicle exists in a non-uniform overlap section, in which the first pattern and the second pattern overlap each other to a non-uniform degree, in an irradiation section of the light.

2. The automotive lamp of claim 1, wherein the light irradiation device includes,
a first light irradiator disposed on a front left side of a first vehicle having the light irradiation device to form the first pattern; and
a second light irradiator disposed on a front right side of the first vehicle to form the second pattern,
wherein each of the first light irradiator and the second light irradiator include at least one light source.

3. The automotive lamp of claim 2, wherein a plurality of light sources included in each of the first light irradiator and the second light irradiator respectively are configured to form a plurality of partial beam patterns by irradiating light, and the beam pattern is formed by the synthesis of the partial beam patterns.

4. The automotive lamp of claim 3, wherein when the second vehicle exists in the non-uniform overlap section, the control device is configured to adjust the light irradiation device to prevent light from being irradiated from at least one of the light sources which corresponds to an overlap area between the first pattern and the second pattern.

5. The automotive lamp of claim 3, wherein when the second vehicle exists in the non-uniform overlap section, the control device is configured to adjust the light irradiation device to reduce the amount of light of at least one of the light sources which corresponds to the overlap area between the first pattern and the second pattern.

6. The automotive lamp of claim 1, wherein the shadow area includes, a first shadow area which corresponds to a size of the second vehicle; and a second shadow area which extends from a boundary of the first shadow area by a preset size.

7. The automotive lamp of claim 6, wherein the control device is configured to determine the second shadow area to a greater size when the second vehicle exists in the non-uniform overlap section than when the second vehicle exists in a uniform overlap section, in which the first pattern and the second pattern overlap each other to a uniform degree, in the irradiation section of the light.

8. The automotive lamp of claim 1, wherein the second vehicle includes a preceding vehicle.

9. A method of controlling an automotive lamp, comprising:
forming, by a controller, a first pattern and a second pattern, which at least partially overlap each other, by irradiating light;
determining, by the controller, whether a second vehicle exists in an area of a beam pattern in which the first pattern and the second pattern are synthesized with each other; and
forming, by the controller, a shadow area at a position of the second vehicle by adjusting a light irradiation device based on the determination result,
wherein the forming of the shadow area includes setting a size of the shadow area by determining whether the second vehicle exists in a non-uniform overlap section, when the first pattern and the second pattern overlap each other to a non-uniform degree in an irradiation section of the light.

10. The method of claim 9, wherein the light irradiation device which irradiates the light includes,
a first light irradiator disposed on a front left side of a first vehicle having the light irradiation device to form the first pattern; and
a second light irradiator disposed on a front right side of the first vehicle to form the second pattern,
wherein each of the first light irradiator and the second light irradiator includes at least one light source.

11. The method of claim 10,
wherein a plurality of light sources included in each of the first light irradiator and the second light irradiator respectively are configured to form a plurality of partial beam patterns by irradiating light, and
wherein the beam pattern is formed by the synthesis of the partial beam patterns.

12. The method of claim 11, wherein the forming of the shadow area includes, when the second vehicle exists in the non-uniform overlap section, adjusting the light irradiation device to prevent irradiation from at least one of the light sources which corresponds to an overlap area between the first pattern and the second.

13. The method of claim 11, wherein the forming of the shadow area includes, when the second vehicle exists in the non-uniform overlap section, adjusting the light irradiation device to reduce the amount of light of at least one of the light sources which corresponds to the overlap area between the first pattern and the second pattern.

14. The method of claim 9, wherein the shadow area includes,
a first shadow area which corresponds to a size of the second vehicle; and
a second shadow area which extends from a boundary of the first shadow area by a preset size.

15. The method of claim 14, wherein the forming of the shadow area includes determining by the controller, the second shadow area to a larger size when the second vehicle exists in the non-uniform overlap section than when the second vehicle exists in a uniform overlap section, in which the first pattern and the second pattern overlap each other to a uniform degree, in the irradiation section of the light.

16. The method of claim 10, wherein the second vehicle includes a preceding vehicle.

* * * * *